United States Patent
Sivaji et al.

(10) Patent No.: US 10,936,648 B2
(45) Date of Patent: Mar. 2, 2021

(54) GENERATING SLIDE PRESENTATIONS USING A COLLABORATIVE MULTI-CONTENT APPLICATION

(71) Applicant: Google LLC, Mountain View, CA (US)

(72) Inventors: Vishnu Sivaji, New York, NY (US); Steven Joseph Saviano, Brooklyn, NY (US); Andrea Dulko, Brooklyn, NY (US); Shruti Jain, Bangalore (IN); Shrikant R. Shanbhag, Jersey City, NJ (US); Arijit De, Bangalore (IN); Max Harris Kessler, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/839,778

(22) Filed: Dec. 12, 2017

(65) Prior Publication Data
US 2019/0179916 A1 Jun. 13, 2019

(51) Int. Cl.
*G06F 3/048* (2013.01)
*G06F 16/438* (2019.01)
(Continued)

(52) U.S. Cl.
CPC ........ *G06F 16/4393* (2019.01); *G06F 3/0481* (2013.01); *G06F 16/34* (2019.01); *G06F 40/106* (2020.01); *G06Q 10/10* (2013.01)

(58) Field of Classification Search
CPC .... G06F 16/4393; G06F 16/34; G06F 3/0481; G06F 17/30056; G06F 17/30716;
(Continued)

(56) References Cited

U.S. PATENT DOCUMENTS 6,970,859 B1 * 11/2005 Brechner ................ G06F 16/40
7,171,619 B1 * 1/2007 Bianco .............. G06F 17/30997
707/999.007

(Continued)

FOREIGN PATENT DOCUMENTS

EP 0933712 A2 1/1999
WO 201318445 A1 12/2013

OTHER PUBLICATIONS

Bob Flisser, "How to use and edit PowerPoint Master Slides", Date: Mar. 2014, publisher: Tuts+, pp. 1-18 (Year: 2014).*
(Continued)

*Primary Examiner* — Wilson W Tsui
(74) *Attorney, Agent, or Firm* — Lowenstein Sandler LLP

(57) ABSTRACT

A method includes displaying, in a user interface on a user device, an electronic document including content, receiving a selection of a portion of the content, and responsive to the selection, modifying the user interface to include, in a first portion of the user interface, one or more slides generated based on the selected portion of the content while continuing to display the electronic document including the content in a second portion of the user interface. Another method may include displaying, in a user interface at a user device, a first electronic document, receiving, via the user interface, a request to view slides from a second electronic document, receiving, via the use interface, a selection of a slide to insert into the first electronic document, and responsive to the user selection of the slide, modifying the user interface to include the selected slide in the first electronic document.

23 Claims, 21 Drawing Sheets

(51) Int. Cl.
*G06Q 10/10* (2012.01)
*G06F 40/106* (2020.01)
*G06F 16/34* (2019.01)
*G06F 3/0481* (2013.01)

(58) Field of Classification Search
CPC .... G06F 40/106; G06F 17/27; G06F 17/2775; G06F 17/2785; G06F 40/253; G06F 40/30; G06F 40/279; G06F 2216/11; G06Q 10/10
See application file for complete search history.

(56) References Cited

U.S. PATENT DOCUMENTS

| | | | |
|---|---|---|---|
| 7,631,254 B2 | 12/2009 | Layard et al. | |
| 8,504,827 B1* | 8/2013 | Sizer | G06F 21/6227 713/167 |
| 8,904,269 B2 | 12/2014 | Antley | |
| 2002/0194227 A1* | 12/2002 | Day | G06F 17/2247 715/234 |
| 2004/0172584 A1* | 9/2004 | Jones | G06F 9/543 715/213 |
| 2004/0216149 A1 | 10/2004 | Reitz et al. | |
| 2005/0108619 A1* | 5/2005 | Theall | G06F 17/30038 715/229 |
| 2006/0036964 A1* | 2/2006 | Satterfield | G06F 3/0481 715/777 |
| 2006/0059442 A1* | 3/2006 | Bornstein | G06F 17/211 715/854 |
| 2008/0243892 A1* | 10/2008 | Little | G06F 17/30569 |
| 2009/0150800 A1 | 6/2009 | Wood et al. | |
| 2011/0185297 A1* | 7/2011 | Reid | G06F 3/04845 715/765 |
| 2011/0264705 A1 | 10/2011 | Diamond | |
| 2012/0192064 A1* | 7/2012 | Antebi | G06F 17/2288 715/255 |
| 2013/0097177 A1 | 4/2013 | Fan et al. | |
| 2014/0075296 A1 | 3/2014 | Schaad et al. | |
| 2014/0157169 A1* | 6/2014 | Kikin-gil | G06F 9/543 715/770 |
| 2014/0380171 A1* | 12/2014 | Maloney | G06F 3/04847 715/732 |
| 2017/0147568 A1* | 5/2017 | Chen | G06F 17/3007 |
| 2017/0262416 A1 | 9/2017 | Rezgui | |
| 2018/0349449 A1* | 12/2018 | Lindley | G06F 16/43 |

OTHER PUBLICATIONS

Pinard et al ("CMPTR", Date: 2016, publisher: Cengage Learning, p. 603 (Year: 2016).*
"Al Masum S M et al: ""Auto-Presentation: A Multi-Agent System for Building Automatic Multi-Modal Presentation of a Topic from World Wide Web Information"", Intelligent Agent Technology, IEEE/WIC/ACMinternational Conference on Compiegne Codex, France Sep. 19-22, 2005, Piscataway, NJ, USA, IEEE, Sep. 19, 2005 (Sep. 19, 2005). pp. 246-249."
European Combined Search and Examination Report for G. B. Application No. 1718646.1 dated Apr. 24, 2018 4 pages.
"M Sravanthi et al: ""SlidesGen: Automatic Generation of Presentation Slides for a Technical Paper Using Summarization"", Proceedings of the Twenty-Second International Flairs Conference (2009),May 19, 2009 (May 19, 2009), pp. 284-289."
"Bhandare Anuja A et al: ""Automatic era: Presentation slides from Academic paper"", 2016 International Conference on Automatic Control and Dynamic Optimization Techniques (ICACDOT), IEEE,Sep. 9, 2016 (Sep. 9, 2016), pp. 809-814.".
"B Muthazhagan et al: ""A Text Mining Approach to Generate Powerpoint Presentation Using Machine LearningAlgorithm"", Middle-East Journal of Scientific Research, vol. 24, No. 5, Aug. 1, 2016 (Aug. 1, 2016),pp. 1692-1699."
"Anonymous: ""Predicting Chart Types with Machine Learning—Feature Releases—Chartio Community"",Web Archive webpage,Jun. 6, 2016 (Jun. 6, 2016), pp. 1-3, XP554281 02,Retrieved from the Internet: URL:http ://web.archive.org/web/20160606043352/http:// community.chartio.com :80/t/predicting-chart-types-with-machine-learning/93 [retrieved on Nov. 23, 2017] 3 pages."
PCT Search Report & Written Opinion, Re: Application # PCT/US2017/060933, dated Nov. 9, 2017. 18 pages.
European Combined Search and Examination Report for G. B. Application No. 1718646.1 dated Jan. 23, 2020 4 pages.
Office Action for D.E. Application No. 201820107014.2 dated Mar. 7, 2019 2 pages.

* cited by examiner

GENERATING SLIDE PRESENTATIONS USING A COLLABORATIVE MULTI-CONTENT APPLICATION

BACKGROUND

A presentation slide deck may include a set of presentation slides that may be displayed to one or more people to provide visual illustration during a presentation. A presentation slide may refer to a display page that includes text, images, video, and/or audio for presenting to the one or more people. For example, a presentation slide may include short sentences or bullet points to describe information that is to be conveyed by the presenter. To prepare a set of presentation slides, a presenter may conduct research and collect one or more documents relating to a presentation topic. The presenter may summarize a large amount of textual content from the documents into short descriptions or illustrations in the presentation slides. Further, a presenter may also design and arrange the layout and format of each slide, such as font size, color, background color, bullet point aligning, and/or animation configuration.

SUMMARY

Aspects and implementations of the present disclosure are directed to a collaborative multi-content application that enables accessing source content and building slides of a slide presentation in a single user interface. For example, the collaborative multi-content application may provide a user interface including an electronic document having content to a user device. A user may select a portion of the content for slide generation. The user interface may be modified to display the generated slide in a first portion of the user interface while continuing to display the electronic document in a second portion of the user interface. The slide may be edited in or deleted from the first portion of the user interface while the electronic document is displayed in the second portion, among other things. Thus, the user can build a slide presentation in the same user interface that displays source material for the slide presentation without having to switch between user interfaces. In some instances, performance of the computing device may be improved because just one user interface of the collaborative multi-content application may be opened, instead of at least one user interface for a first application for the source content and a second user interface for a second application for a slide presentation.

Additionally, aspects and implementations of the present disclosure are directed to inserting displaying a first electronic document (e.g., collaborative text document) and enabling a user to insert one or more slides from a second electronic document (e.g., collaborative slide presentation) into the first electronic document. The slide may be selected from a file dropdown menu in the user interface of the collaborative multi-content application or from a sidebar presentation tool in the first portion of the user interface of the collaborative multi-content application. Once the slide is inserted, the user can edit the slide directly in the electronic document and launch a slide presentation in presentation mode from the user interface. This technique may also improve processing speed of the computing device and/or reducing memory consumption by reducing the number of applications that need to be open to interact with source content and a slide presentation.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
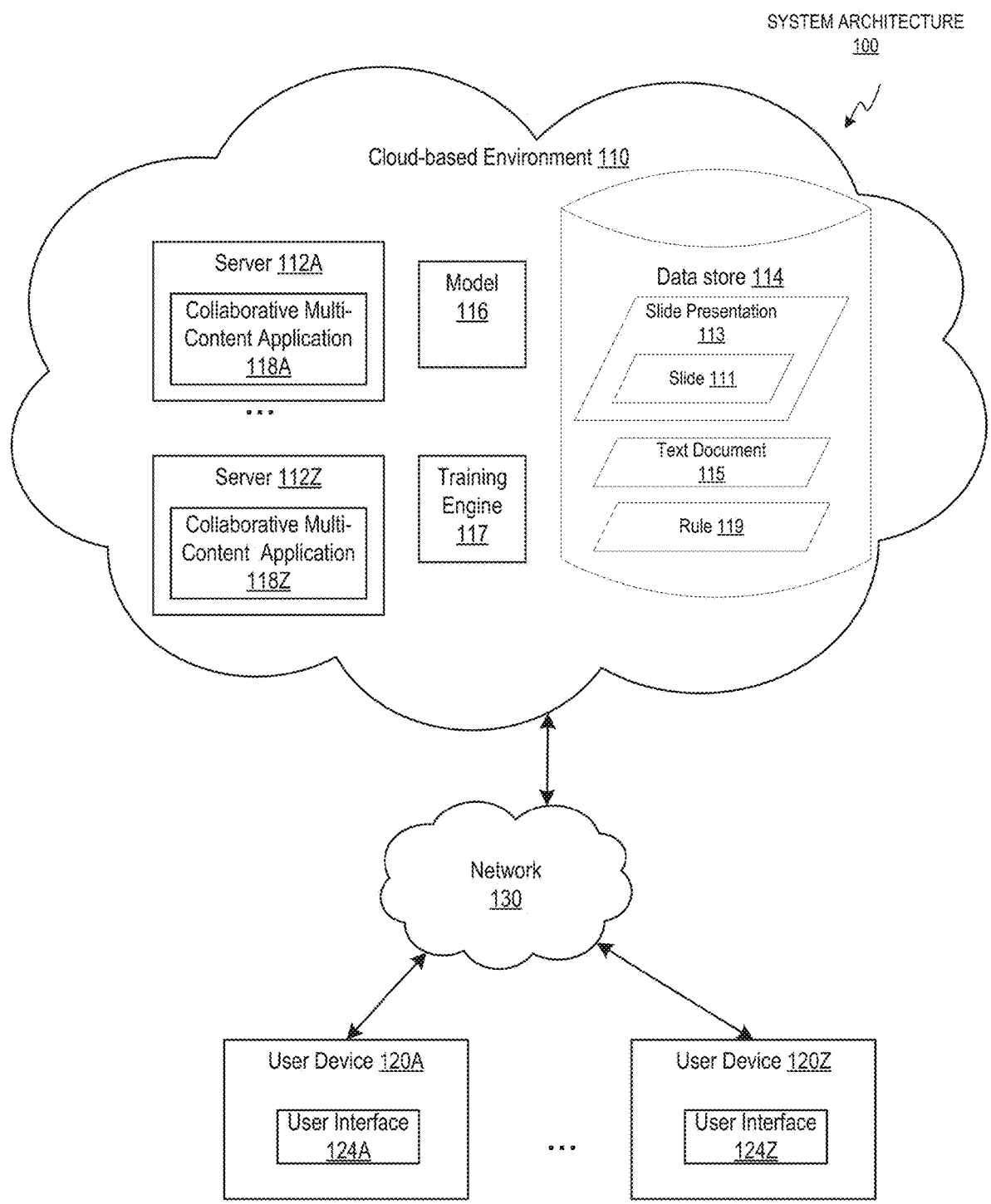
FIG. 1 illustrates an example of a system architecture for implementations of the present disclosure.

Cloud-based content management platforms may provide file storage and synchronization services, among other things. For example, a cloud-based content management platform may enable a user to store files on one or more servers in a cloud-based environment, synchronize the files across various devices of the user, and share the files with one or more other users. In some instances, the cloud-based content management platform may provide a centralized location to manage the files for the user. For example, the files may include electronic documents created using collaborative document applications (e.g., collaborative text processing application, collaborative spreadsheet application, collaborative slide presentation application).

An electronic document refers to media content used in electronic form. Media content may include text, tables, videos, audio, images, graphs, slides, charts, software programming code, designs, lists, plans, blueprints, maps, etc. The cloud-based content management platform may enable an author of an electronic document to invite other users to join as collaborators with respect to the electronic document stored in the cloud-based platform. An electronic document to which users have been granted permission to access and/or edit concurrently may be referred to as a collaborative document herein. Although the techniques described herein generally relate to using collaborative documents, it should be noted that the techniques may be applied to any suitable electronic documents.

The collaborative document may be provided to user devices of the collaborators via the cloud-based content management platform by one or more servers in the cloud-based environment. Each collaborator may be associated with a user type (e.g., editor, reviewer, viewer, etc.). Different views and capabilities may be provided to the collaborators based on their user type to enable editing (e.g., actually adding/changing text and/or suggesting changes), commenting on, reviewing, or simply viewing the collaborative document. Once granted permission to access the collaborative document, the collaborators may access the collaborative document to perform operations allowed for their user type. For example, numerous users with user types of reviewers may concurrently view and concurrently make comments on a collaborative text document. Additionally, users with user types of editors may suggest changes to a collaborative text document that cause comments to be created including the suggestions.

A user may use the cloud-based content management platform to create a collaborative slide presentation. Conventionally, there may be numerous actions for a user to perform when parsing source content of a collaborative text document and creating a collaborative slide presentation. For example, the user may have to find and open each of the related collaborative text documents or any suitable data file using a first application (e.g., collaborative word processing application) for a particular topic. The user may have to parse large portions of the source content and select salient points from the source content to include in the slide presentation in a second application (e.g., collaborative slide presentation application). The user may have to copy numerous sections of content from the source content to the various slides of the collaborative slide presentation.

In some cases, maintaining the various source data files open in various instances of the first application and the collaborative slide presentation in the second application may cause one or more issues. For example, the processing speed of a computing device may be slowed down by maintaining the various source data files open in the disparate applications (e.g., the word processing application and the slide presentation application). Further, the user may have to switch back and forth from the first application to copy the desired content and then to the second application to paste the desired content into a slide. Switching between user interfaces may also cause performance issues for the computing device. Also, managing all the different source data files in the instances of the first application and the slide presentation in the second application may create cognitive load for the user who has to mentally keep track of the data files and the slide presentation.

Accordingly, some embodiments of the present disclosure may relate to providing a collaborative multi-content application that provides the ability to access source content and build a slide presentation in a single user interface. "Multi-content" may refer to the collaborative multi-content application's ability to provide and manage content having different types, such as text documents and slide presentations, for example. The embodiments may provide a technical effect caused by and/or resulting from a technical solution to a technical problem. For example, one technical problem may relate to inefficient and/or over consumption of resources (e.g., processing, memory) by managing a collaborative text document and a collaborative slide presentation in different user interfaces of different applications. One of the technical solutions to the technical problem may include managing the collaborative text document and the collaborative slide presentation in a single user interface. In some embodiments, the user can build a slide presentation using the user interface of the collaborative multi-content application without having to switch between different user interfaces. A technical effect that may result from and/or is caused by the technical solution to the technical problem may include improving performance of the computing device because just the user interface of the collaborative multi-content application may be opened, instead of at least the user interface of the first application for the source content and the user interface of the second application for the slide presentation, as described above. The collaborative multi-content application may be launched from the cloud-based content management platform.

The collaborative multi-content application may provide a user interface having a first portion to enable creating slides, viewing slides, editing slides, exporting slides, summarizing slides, deleting slides, presenting slides, etc. and having a second portion for a collaborative text document or any suitable data file that enables viewing, editing, etc. of source content. The first portion may include a sidebar presentation tool of the user interface and may be displayed together with the collaborative text document including the source content in the second portion of the user interface. In some embodiments, a user may select (e.g., highlight) one or more portions of content in the collaborative text document to use to create slides in the sidebar presentation tool. The sidebar presentation tool may not be visible until at least one slide is generated, or the sidebar presentation tool may be visible with an empty set of slides. The techniques disclosed herein may provide a user with granular control of which content to create slides for and avoids the need to switch between user interfaces and/or applications (e.g., a text processing application and a slide presentation application) to generate and manage a slide presentation including source content.

In some embodiments, the collaborative multi-content application may enable the user to edit the slides displayed in the sidebar presentation tool without opening another application (e.g., slide presentation application). Also, the sidebar presentation tool may include options that enable the user to enable or disable distilling content on a per slide basis. Distilling may refer to reducing extracted content from a first amount of content to a second lesser amount of content. For example, distilling may refer to summarizing text included in content from a first number of sentences to a second number of sentences that is less than the first number of sentences. Distilling and summarizing, and their respective variations (e.g., distillation, summarization), may be used interchangeably herein.

In some embodiments, a user may select a slide displayed in the sidebar presentation toolbar and the content in the collaborative text document that was used to generate the slide may be selected (e.g., highlighted). The sidebar presentation toolbar may also provide an option to delete the selected slide. Further, in some embodiments, the collaborative multi-content application may cause the slide presentation displayed in the sidebar presentation tool to be presented full-screen responsive to the user selecting a particular graphical element in the user interface. Additionally, in some embodiments, the user may add the generated slides displayed in the sidebar presentation tool to an existing slide presentation (e.g., by importing them into the existing slide presentation) or to save the slides as a new slide presentation. The user may also launch a dedicated collaborative slide presentation application in a separate user interface (e.g., browser window) including the generated slides from the sidebar presentation tool, if desired.

In another implementation, the collaborative multi-content application may enable a user to select a slide from the sidebar presentation tool or from a menu option dropdown list and insert the slide directly into the source content of the collaborative text document being displayed in the user interface. This implementation may also provide a technical effect caused by and/or resulting from a technical solution to a technical problem. For example, one technical problem may relate to inefficient and/or over consumption of resources (e.g., processing, memory) by managing a collaborative text document and a collaborative slide presentation in different user interfaces of different applications. One of the technical solutions to the technical problem may include enabling inserting a slide directly into a collaborative text document within the same user interface by a slide associated with a new insert data type. Further the user may edit the slide in-line in the collaborative text document and the user can launch a slide presentation of the slides included in the collaborative text document from the collaborative multi-content application without having to open another application (e.g., slide presentation application) in a separate user interface to launch the slide presentation. Accordingly, a technical effect of this implementation may also improve processing speed of the computing device by reducing the number of applications that need to be open to interact with source content and a slide presentation.

FIG. 1 illustrates an example of a system architecture 100 for implementations of the present disclosure. The system architecture 100 includes a cloud-based environment 110 connected to user devices 120A-120Z via a network 130. A cloud-based environment 110 refers to a collection of physical machines that host one or more applications (e.g., a collaborative multi-content application) providing one or more services (e.g., word processing, slide generation for inclusion in a slide presentation, managing source content and a slide presentation in a single user interface, inserting slide(s) into a collaborative text document, etc.) to multiple user devices 120 via a network 130. The network 130 may be public networks (e.g., the Internet), private networks (e.g., a local area network (LAN) or wide area network (WAN)), or a combination thereof. Network 130 may include a wireless infrastructure, which may be provided by one or more wireless communications systems, such as a wireless fidelity (WiFi) hotspot connected with the network 130 and/or a wireless carrier system that can be implemented using various data processing equipment, communication towers, etc. Additionally or alternatively, network 130 may include a wired infrastructure (e.g., Ethernet).

The cloud-based environment 110 may include one or more servers 112A-112Z, training engine 117, and a data store 114. The training engine 117 and/or the data store 114 may be separate from the servers 112A-112Z and communicatively coupled to the servers 112A-112Z or the training engine 117 and/or the data store 114 may be part of one or more of the servers 112A-112Z. In some embodiments, the data store 114 may be included as part of the user devices 120A-120Z. The data store 114 may store various collaborative documents, such as a collaborative slide presentation 113 including one or more slides 111, a collaborative text document 115, or any suitable electronic document (e.g., an electronic document including text, tables, videos, images, graphs, slides, charts, software programming code, designs, lists, plans, blueprints, maps, etc.) that can be shared with users and/or concurrently editable by users. The term "concurrently editable" may refer to users concurrently modifying (e.g., adding, deleting, changing, etc.) content (e.g., text, cells, images, data, slides, etc.), concurrently suggesting changes to the content, concurrently making comments on the content, and the like. In some embodiments, the collaborative text document 115 may include source content (e.g., text, images, tables, etc.) that is used to generate the one or more slides 111 of the slide presentation 113. The slides 111 may be dynamically generated slides based on selected content from the collaborative text documents 115, template slides having a particular layout, slides generated by a user, or the like.

The collaborative documents may be created by an author and the author may share the collaborative documents with other users (e.g., collaborators). Sharing the collaborative documents may refer to granting permission to the other users to access the collaborative documents. Sharing the collaborative documents may include informing the other users of the collaborative documents via a message (e.g., email) including a link to the collaborative documents. The level of permissions that each user is granted may be based on the user type of each particular user. For example, a user with an editor user type may be able to open the collaborative documents and make changes directly to the collaborative documents. As such, numerous collaborators may concurrently make changes to the content included in the collaborative document.

The training engine 117 may include a processing device or devices, such as a computer, microprocessor, logic device or other device or processor that is configured with hardware, firmware, and software to carry out some of the embodiments described herein. The training engine 117 may include or have access to a set of training data files including content (e.g., text, data tables, images, video, audio, etc.) and corresponding summaries for each of the training data files that are used as training data by the training engine 117 to train a machine learning model 116 to perform extraction-based summarization. A machine learning model 116 may refer to a model artifact that is created by the training engine 117 using training inputs and corresponding target outputs. The training inputs may include the set of training data files, and the corresponding target outputs may include summaries for respective training inputs. In some embodiments, the training data files and the corresponding target outputs may include a particular format (e.g., bullet point list). The machine learning model 116 may use the training inputs and target outputs to learn features of words, phrases, or sentences in text that make them good candidates to be included in a summary (distilled content). The features may include the position in the text (e.g., a first sentence may be a topic sentence and provide a good overview of a paragraph, the first few sentences may be relevant, a last sentence may be a conclusion and may be relevant), frequent words or phrases, number of words in sentences, etc. Once trained, the machine learning model 116 may be applied to new content to obtain a summary (distilled content) for the new data file 116. In some implementations, distilled content may be included in a new slide 111 generated by the collaborative multi-content application 118A-118Z.

The servers 112A-112Z may be physical machines (e.g., server machines, desktop computers, etc.) that each include one or more processing devices communicatively coupled to memory devices and input/output (I/O) devices. The servers 112A-112Z may host a collaborative multi-content application (118A-118Z). The collaborative multi-content application 118A-118Z may be implemented as computer instructions that are executable by one or more processing devices on each of the servers 112A-112Z. In alternative implementations, the collaborative multi-content application 118A-118Z may be installed on the user devices 120A-120Z (e.g., as a standalone application) and operate as peers in a peer-to-peer environment. The server 112A-112Z selected to host the collaborative multi-content application 118A-118Z may be based on certain load-balancing techniques, service level agreements, performance indicators, or the like.

The collaborative multi-content application 118A-118Z may enable a user to view, manage, generate, interact with a collaborative text document 115 and slides 111 of a collaborative slide presentation 113 with which they created or are associated with in a single user interface 124A-124Z. Additionally, in some embodiments, the collaborative multi-content application 118A-118Z may provide the user interface 124A-124Z that displays the generated slides 111 in a first portion together with the collaborative text document 115 in a second portion to the user devices 120A-120Z.

For example, the collaborative multi-content applications 118A-118Z may enable a user to select content from the collaborative text document 115 displayed in a second portion of the user interfaces 124A-124Z to generate a slide 111 in a presentation 113 displayed in a first portion of the user interface 124A-124Z. Further, the collaborative multi-content applications 118A-118Z may enable a user to insert a slide 111 as content in a collaborative text document 115 and to interact with the slide 111 in-line in the collaborative text document 115.

The collaborative multi-content applications 118A-118Z may also enable users using different user devices 120A-120Z to simultaneously access the collaborative document (113 and/or 115) to comment on, edit (e.g., modify or suggest changes), and/or view the collaborative document in a respective user interface of the respective collaborative multi-content application 118A-118Z that displays the collaborative document in the user interfaces 124A-124Z. In an implementation, the user interfaces 124A-124Z of the collaborative multi-content applications 118A-118Z may be web pages rendered by a web browser and displayed on the user device 120A-120Z in a web browser window. In another implementation, the user interfaces 124A-124Z may be included in a native application executing on the user device 120A-120Z. The native application may be separate from a web browser.

The user devices 120A-120Z may include one or more processing devices communicatively coupled to memory devices and I/O devices. The user devices 120A-120Z may be desktop computers, laptop computers, tablet computers, mobile phones (e.g., smartphones), or any suitable computing device. A user may open an existing collaborative text document 115 using the collaborative multi-content application 118A-118Z (e.g., if the user is the author or the collaborative text document 115 is shared with the user) or create a new collaborative text document 115. As such, the user device 120A associated with the user may request the collaborative text document 115 from the cloud-based environment 110.

One or more of the servers 112A-112Z may provide the requested collaborative text document 115 to the user device 120A. In some instances, the user interface 124A of the collaborative multi-content application 118A-118Z may display the collaborative text document 115. A user may select (e.g., highlight) various content in the collaborative text document 115 to use to create one or more slides 111. The user device 120A may send a request to the collaborative multi-content application 118A-118Z to generate one or more slides 111 based on the selected content. The collaborative multi-content application 118A-118Z may generate the one or more slides 111 based on the selected content and cause the user interface 124A-124Z to update to display a sidebar presentation tool (if not already being displayed) including the generated slides 111 in a first portion of the user interface 124A together with the collaborative text document 115 (e.g., source content) displayed in a second portion of the user interface 124A. In some embodiments, the slides 111 displayed in the sidebar presentation tool may be editable by the user. For example, the user may change the font in the slides 111, change the font type, change the font size, change the font color, insert objects (e.g., images), change the background color, and so forth, directly in the slide 111 displayed in the sidebar presentation tool without opening a separate application (e.g., a dedicated slide presentation application).

In some embodiments, the collaborative multi-content application 118A-118Z may distill (e.g., summarize) the content selected for slide generation. As discussed below, the user interface 124A-124Z displaying the sidebar presentation tool may include options to enable summarization on a per slide basis (e.g., summarize may be enabled for one slide 11 and disabled for a second slide 111). In some embodiments, summarization may be enabled or disabled by default, which may be a configurable setting. As noted above, if summarization is enabled, the collaborative multi-content application 118A-118Z may apply the selected content as input to the machine learning model 116 that is trained to produce the distilled content as a target output. In one embodiment, the collaborative multi-content application 118A-118Z may use one or more rules 119 that define heuristics for distilling the content. The rules 119 may be predefined by a developer. The rules 119 may be applied to the content selected for slide generation from the collaborative text document 115 to distill the content.

For example, if the content is text, one rule 119 may define that the text that is to be included in a slide 111 does not overflow the slide 111. In such cases, the text may be distilled into different subsets and each subset may be included in a different slide 111 such that the subset of text properly fits within the different slides 111. The rule 119 may define that complete sentences or an individual bullet point is not broken up when separating the text between slides 111. Another rule 119 may define using a sentence for a bullet point based on the sentence's position in a paragraph (e.g., a first sentence in a paragraph of text as a bullet point for a slide 111 because the first sentence is likely to be a topic sentence, or using a last sentence in the paragraph as a bullet point because the last sentence is likely to include a conclusion). Another rule 119 may define that frequently appearing words or phrases in a body of text are to be distilled and a single sentence is to be included as a bullet point with the frequently appearing words or phrases while some of the other sentences with less frequently appearing words or phrases are to be ignored. Another rule 119 may define that a maximum number of sentences be distilled for representation in a slide 111.

In some embodiments, a user may select a slide 111 displayed in the sidebar presentation toolbar and the content in the collaborative text document 115 that was used to generate the slide 111 may be selected (e.g., highlighted). The sidebar presentation toolbar may also provide an option to delete the selected slide 111. Further, in some embodiments, the collaborative multi-content application 118A may cause the slides 111 of the slide presentation 113 displayed in the sidebar presentation tool to be presented full-screen responsive to the user selecting a particular graphical element in the user interface 124A. Additionally, in some embodiments, the user may add the generated slides 111 displayed in the sidebar presentation tool to an existing slide presentation (e.g., by importing them into the existing slide presentation) or to save the slides as a new slide presentation 113. The user may also launch a dedicated collaborative slide presentation application in a separate user interface (e.g., browser window) including the generated slides 111 from the sidebar presentation tool, if desired.

In another embodiment, a user viewing the collaborative text document 115 may select a slide 111 (e.g., via a dropdown menu option or from the sidebar presentation tool) to insert as content into the collaborative text document 115 via the user interface 124A. For example, the dropdown menu may include slides available to be inserted provided by the collaborative multi-content application 118A-118Z and/or the sidebar presentation tool may include the generated slides 111 based on the content in the collaborative text document 115. Upon selection of a slide 111, the user device 120A may send the request for slide insertion to the collaborative multi-content application 118A. The collaborative multi-content application 118A may receive a request to insert the selected slide 111 into the collaborative text document 115. The slide 111 may have a particular insert data type or file type that enables inserting the slide 111 into the collaborative text document 115. The inserted slide 111 may be edited in-line in the collaborative text document 115 via the user interface 124A without the user opening a separate application (e.g., a dedicated slide presentation application) in another user interface. Further, in some embodiments, the user may launch a slideshow presentation of the slides 111 inserted into the collaborative text document 115 directly from the user interface 124A-124Z of the collaborative multi-content application 118A-118Z.

Figure 2:
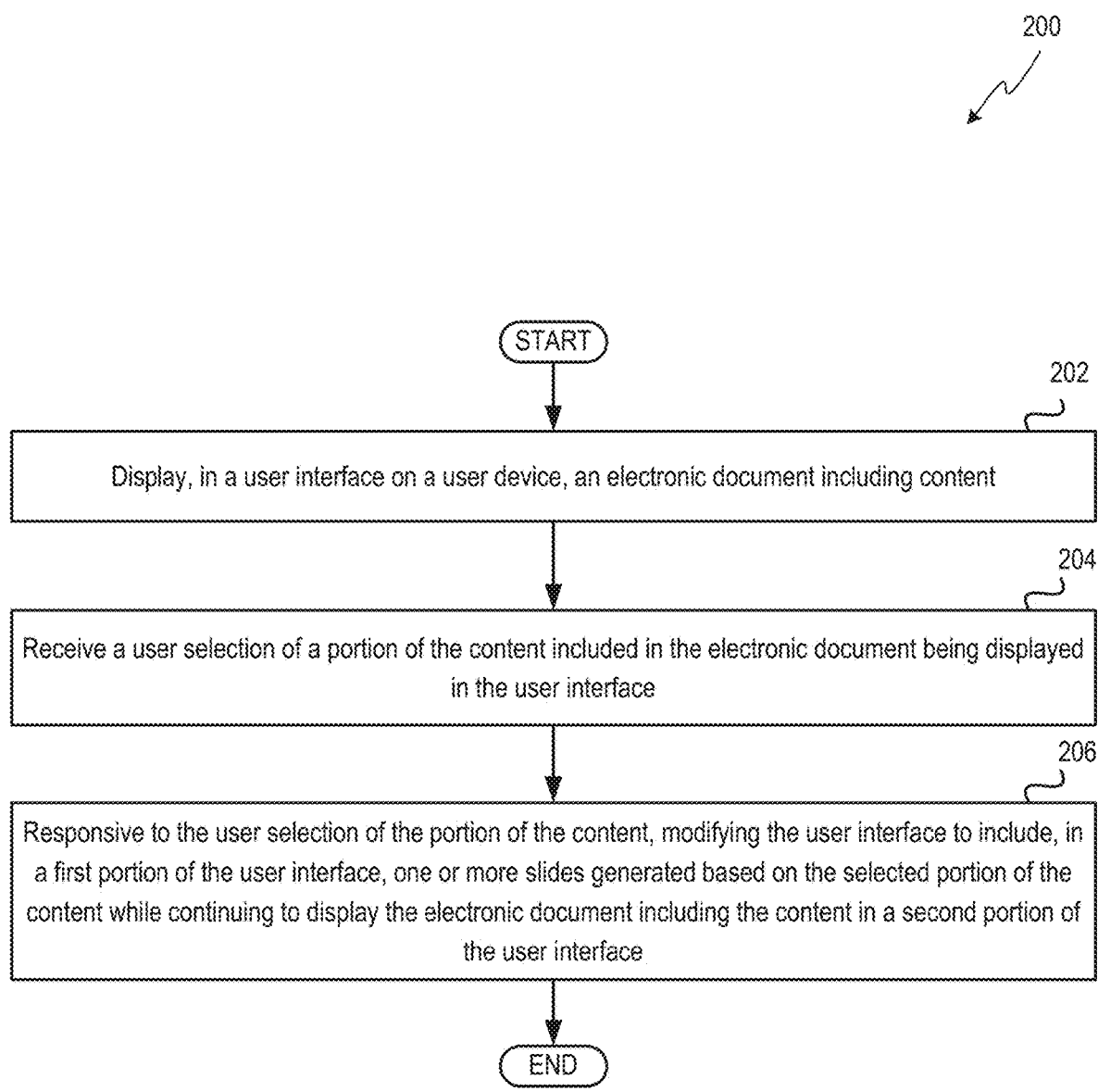
FIG. 2 depicts a flow diagram of aspects of a method for displaying one or more slides together with an electronic document including content in a user interface, in accordance with one implementation of the disclosure.

FIG. 2 depicts a flow diagram of aspects of a method 200 for displaying one or more slides 111 together with an electronic document (e.g., collaborative text document 115) including content in a user interface 124A, in accordance with one implementation of the disclosure. Although the user interface 124A is used for discussion of method 200, it should be understood that any other user interface 124B-124Z may be used, instead of or in addition to the user interface 124A. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by one or more processing devices of the user device 120A-120Z displaying the user interface 124A-124Z of the collaborative multi-content application 118A.

At block 202, the processing device may display, in a user interface 124A of the user device 120A, an electronic document including content. In some embodiments, the electronic document may be a collaborative text document 115 and the content may include text, images, objects, tables, etc. The user interface 124A may be provided by the collaborative multi-content application 118A. The user may select to open the electronic document from a user interface of a cloud-based content management platform.

At block 204, the processing device may receive a user selection of a portion of the content included in the electronic document being displayed in the user interface 124A. In some embodiments, the user may use an input peripheral (e.g., mouse, touchscreen, stylus pen, etc.) to select (e.g., highlight) a portion of the content for which slide generation is desired. In some instances, the selected portion of the content may not include the entire content included in the electronic document. Accordingly, granular creation of slides based on selected portions of content may be enabled by the present disclosure.

In some embodiments, selecting the portion of content may cause one or more options (e.g., graphical elements, such as buttons or a file menu) to be displayed proximate to the selected portion of content. One of the options, upon selection, may cause one or more slides 111 to be generated by the collaborative multi-content application 118A based on the selected portion of content. In another embodiment, the processing device may receive a user selection of an option in the user interface 124A to enter a selecting mode. Any selections of content made while operating in the selecting mode may cause the one or more slides 111 to be generated for the selected content.

At block 206, the processing device may, responsive to the user selection of the portion of the content, modify the user interface 124A to include, in a first portion of the user interface 124A, one or more slides 111 generated based on the selected portion of the content while continuing to display the electronic document including the content in a second portion of the user interface 124A. It should be understood that no other user action may be taken to cause the one or more slides 111 to be generated besides the user selection of the portion of the content for which slide generation is desired. In some embodiments, generated slides 111 may be included in a sidebar presentation tool in the first portion of the user interface 124A provided by the collaborative multi-content application 118A.

The collaborative multi-content application 118A may enable editing the one or more slides 111 via the sidebar presentation tool of the user interface 124A. The user may make edits (e.g., font type change, font size change, font color change, background color change, add object, delete object, update header/footer, etc.) directly in the one or more slides 111 displayed in the user interface 124A. For example, the processing device may receive an edit, in the first portion of the user interface 124A, to a slide 111 of the one or more slides 111. The processing device may further, responsive to receiving the edit, modify the user interface 124A to include, in the first portion of the user interface, the slide 111 with the edit while continuing to display the electronic document including the content in the second portion of the user interface 124A.

The collaborative multi-content application 118A may also enable enabling and disabling summarization by providing a respective summarization option for each slide 111 via the sidebar presentation tool of the user interface 124A. The collaborative multi-content application 118A may distill the content, when the summarization option is enabled, by applying the machine learning model 116 or the rules 119 to the content in the slide. For example, the processing device may display, in the first portion of the user interface 124A, an option for each of the one or more slides 111. The option may enable or disable summarization of content included in a respective slide 111. The option may be configured to default to enabled or disabled as desired. In one embodiment, the processing device may receive a user selection of the option for a slide 111 of the one or more slides 111 to enable summarization of content for the slide 111. Responsive to the user selection of the option, the processing device may reduce the content in the slide 111 from a first number of sentences to a second lesser number of sentences. In another embodiment, the processing device may receive a user selection of the option for a slide 111 of the one or more slides 111 to disable summarization of content for the slide 111. Responsive to the user selection of the option, the processing device may increase the content in the slide 111 from a first number of sentences to a second greater number of sentences.

In some embodiments, the processing device may receive a user selection of a slide 111 of the one or more slides 111 being displayed in the first portion of the user interface 124A. The user selection may be made by a user using an input peripheral, such as a mouse, keyboard, touchscreen, stylus pen, or the like. Responsive to the user selection of the slide, the processing device may modify the user interface 124A to highlight the portion of content in the electronic document that was used to generate the selected slide 111.

Further, an option to delete the selected slide may be displayed upon the slide being selected. In some embodiments, the processing device may receive a user selection to delete the selected slide from the one or more slides being displayed in the first portion of the user interface 124A. Responsive to the user selection of the slide to delete, the processing device may modify the user interface 124A to display, in the first portion, the one or more slides without the selected slide while continuing to display the electronic document including the content in the second portion of the user interface 124A.

In some embodiments, the processing device may also receive a user selection of an option in the user interface 124A to present, in a presentation mode, the one or more slides 111 being displayed in the first portion. The processing device may present the one or more slides 111 full-screen in the presentation mode. The presentation mode may include modifying the user interface 124A such that a slideshow is displayed with a first slide being presented full-screen, and the user may select to advance to a second slide or the slideshow may advance to a second slide after a predetermined time period. In some embodiments, any slide in the slide presentation may be initially presented if the user selects that slide and launches the presentation mode based on the selected slide.

In some embodiments, the processing device may receive a user selection to add the one or more slides 111 to an existing slide presentation (e.g., already created and stored in the data store 114). Responsive to the user selection to add the one or more slides to the existing slide presentation, the processing device may send a request to the collaborative multi-content application 118A that causes the one or slides 111 to be added to the existing slide presentation. In another embodiment, the processing device may receive a user selection to save the one or more slides 111 as a new slide presentation. Responsive to the user selection to save the one or more slides 111 as the new slide presentation, the processing device may send a request to the collaborative multi-content application 118A that causes the one or more slides 111 to be saved as the new slide presentation.

Figure 3:
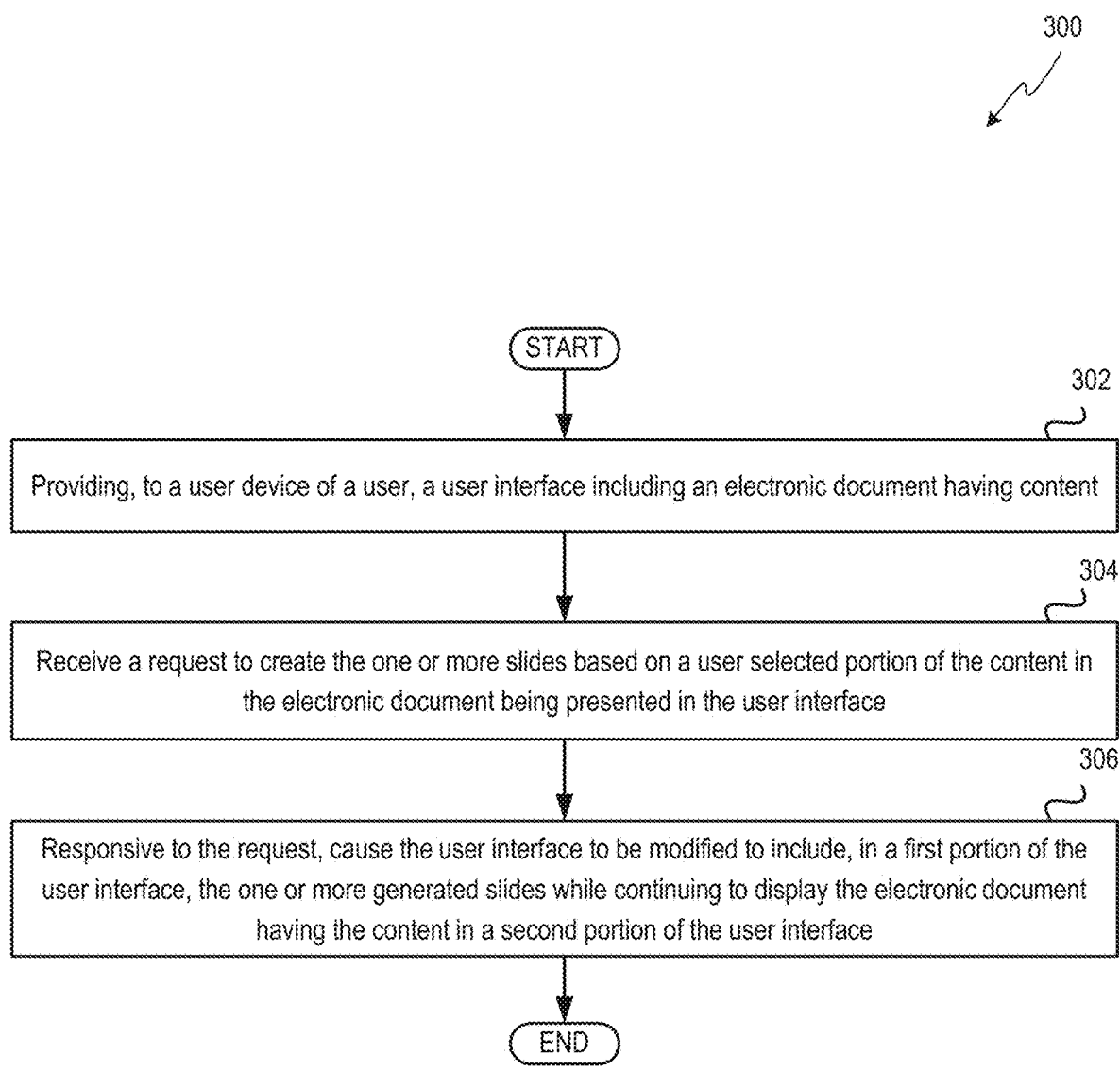
FIG. 3 depicts a flow diagram of aspects of a method for generating one or more slides for display together with an electronic document including content in the user interface, in accordance with one implementation of the disclosure.

FIG. 3 depicts a flow diagram of aspects of a method 300 for generating one or more slides 111 for display together with an electronic document including content in the user interface, in accordance with one implementation of the disclosure. Although the user interface 124A is used for discussion of method 300, it should be understood that any other user interface 124B-124Z may be used, instead of or in addition to the user interface 124A. Method 300 may be performed in the same or a similar manner as described above in regards to method 200. In one implementation, one or more of the operations described with reference to method 300 may be performed by collaborative multi-content application 118A-118Z executed by one or more processing devices of the servers 112A-112Z.

At block 302, the processing device may provide, to a user device 120A of a user, a user interface 124A including an electronic document having content. In some embodiments, the electronic document may be a collaborative text document 115 and the content may be text, images, tables, objects, etc. The processing device may provide the user interface 124A including the electronic document in response to receiving a request to open the electronic document from the user device 120A.

At block 304, the processing device may receive a request to generate one or more slides 111 based on a user selected portion of the content of the electronic document being displayed in the user interface. The user may select the portion of the content in the electronic document using an input peripheral.

The processing device may generate the one or more slides 111. In some embodiments, the processing device may determine a formatting (e.g., title, section header, header and associated body text) of the portion of the content by parsing the selected portion or by analyzing metadata of the electronic document. Based on the format of the selected portion of the content, one or more layout templates may be selected to be used with the portion of the content to generate the slides. For example, a "Title" layout template may be selected to include content having a title format type, a "Title plus Body" layout template may be selected for a header with associated body text where the header text is set to the Title of the slide and the body text is set to the Body of the slide. In some embodiments, the selected portion of the content may be "chunked" into different sections that are included in more than one slide. For example, if the selection portion of content includes two headers each associated with respective body text, then two slides may be generated having the layout template "Title plus Body" where each slide includes one header and its associated body text.

At block 306, the processing device, responsive to the request, may cause the user interface 124A to be modified to include, in a first portion of the user interface 124A, the one or more slides 111 while continuing to display the electronic document having the content in a second portion of the user interface 124A. The processing device may provide a sidebar presentation tool that includes the one or more slides in the first portion of the user interface 124A.

In some embodiments, the processing device may receive, from the sidebar presentation tool displayed in the user interface 124A on the user device 120A, an edit to a slide 111 of the one or more slides 111 being displayed in the first portion of the user interface 124A. Responsive to receiving the edit, the processing device may cause the user interface 124A to be modified to include, in the first portion of the user interface 124A, the slide with the edit while continuing to display the electronic document including the content in the second portion of the user interface 124A.

In some embodiments, the processing device may receive a request to enable summarization of content for a slide 111 of the one or more slides 111. Responsive to the request to enable summarization of content, the processing device may reduce the content in the slide 111 from a first number of sentences to a second lesser number of sentences. The processing device may cause the user interface 124A to be modified to include the slide 111 with the reduced content in the first portion while continuing to display the electronic document including the content in the second portion of the user interface 124A.

In some embodiments, the processing device may receive a request to disable summarization of content for a slide 111 of the one or more slides 111. Responsive to the request to disable summarization of content, the processing device may increase the content in the slide 111 from a first number of sentences to a second greater number of sentences. The processing device may cause the user interface 124A to be modified to include the slide 111 with the reduced content in the first portion while continuing to display the electronic document including the content in the second portion of the user interface 124A.

In some embodiments, the processing device may receive a request to add the one or more slides 111 to an existing slide presentation. Responsive to the request, the processing device may add the one or more slides to the existing slide presentation in the data store 1114. In some embodiments, the processing device may receive a second request to save the one or more slides 111 as a new slide presentation. Responsive to the request, the processing device may save the one or more slides 111 as the new slide presentation in a data store.

Figure 4A:
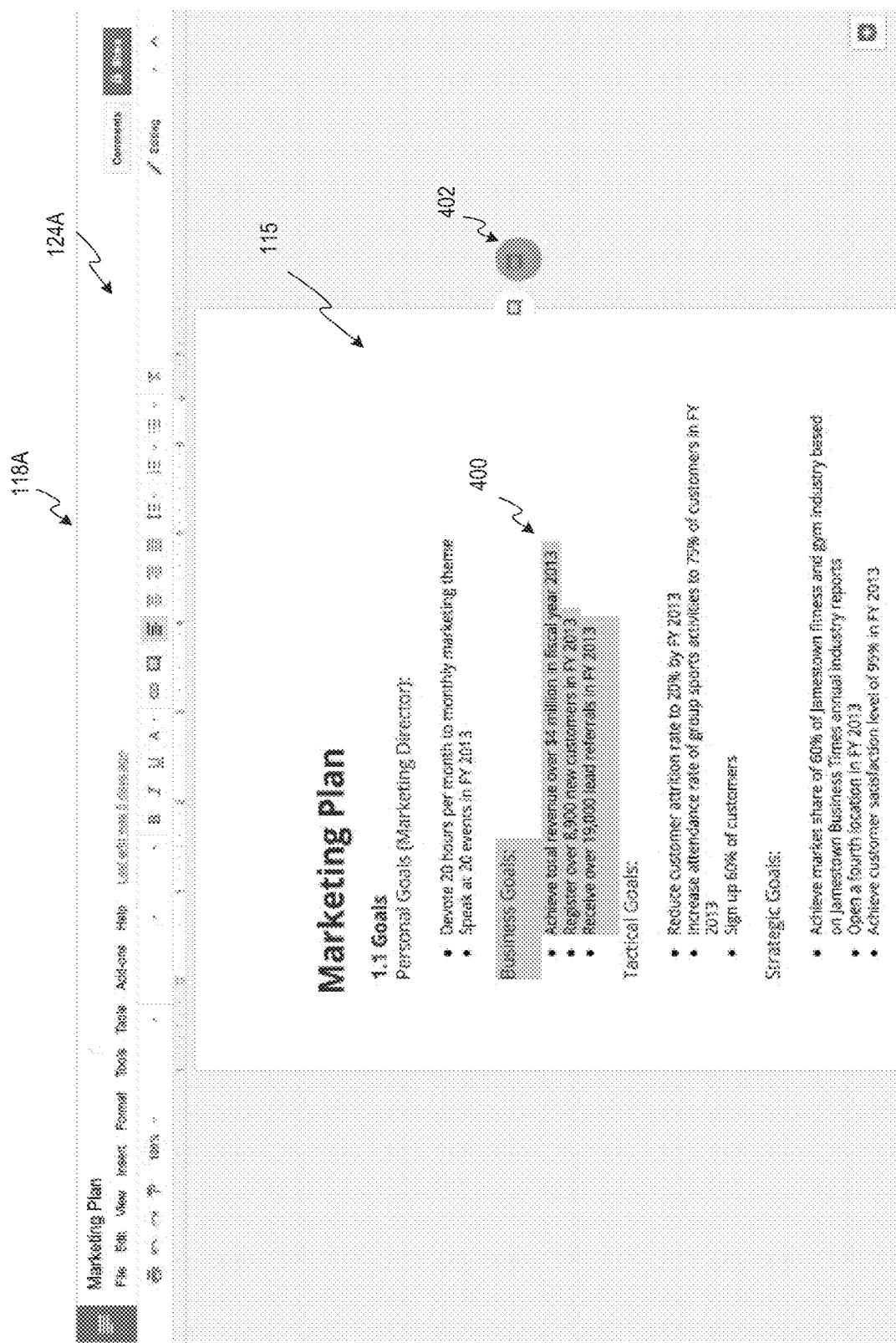
FIG. 4A depicts a user interface of a collaborative multi-content application displaying selected content in a collaborative text document, in accordance with one implementation of the disclosure.

FIG. 4A depicts a user interface 124A of a collaborative multi-content application 118A displaying a selected portion of content 400 in a collaborative text document 115, in accordance with one implementation of the disclosure. As depicted, initially the user interface 124A may just display the collaborative text document 115 (e.g., without displaying a sidebar presentation tool). Upon the user selecting the portion of content 400, one or more graphical elements may appear in the user interface 124A. Alternatively, the user may actuate a button of an input peripheral (e.g., right clicking a mouse button) to cause the graphical elements to appear. The graphical elements may be associated with the selected portion of content 400 and provide various options for the selected portion of content 400. For example, a graphical element 402 may include an option for creating a slide 111 based on the selected portion of content 400. Selecting the graphical element 402 may send a request to the collaborative multi-content application 118A to generate a slide 111 for the selected portion of content 400. The collaborative multi-content application 118A may generate one or more slides 111 based on the selected portion of content 400 and return the generated one or more slides. In another embodiment, as described further below, when the user causes the collaborative multi-content application 118A to enter a certain mode (e.g., selecting mode), simply selecting (e.g., highlighting) the content 400 in the collaborative text document 115 may cause one or more slides to be generated for the selected content 400.

Figure 4B:
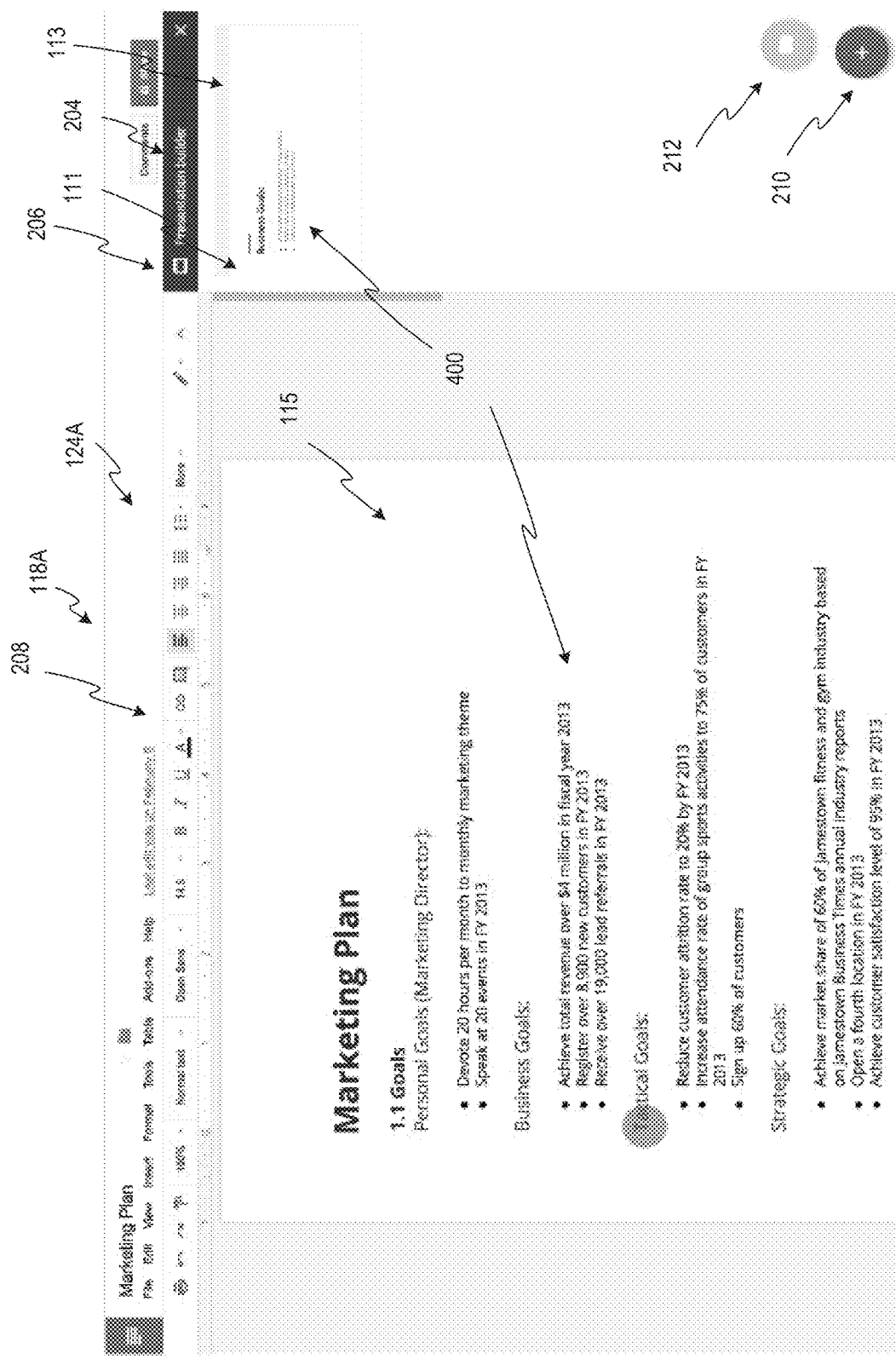
FIG. 4B depicts the user interface of the collaborative multi-content application displaying a sidebar presentation tool including a slide generated from the selected content of FIG. 2A, in accordance with one implementation of the disclosure.

FIG. 4B depicts the user interface 124A of the collaborative multi-content application 118A displaying a sidebar presentation tool 204 including a slide 111 of a collaborative slide presentation 113 generated from the selected portion of content 400 of FIG. 2A, in accordance with one implementation of the disclosure. As depicted, the user interface 124A presents sidebar presentation tool 204 including the slide 111 in a first portion 206 of the user interface 124A while continuing to display the collaborative text document 115 in a second portion 208 of the user interface 124A. Presenting the slide 111 of the collaborative slide presentation 113 together with the collaborative text document 115 in a single user interface 124A may enhance computing speed and/or reduce memory usage by the user avoiding opening numerous different applications in different user interfaces.

The slide 111 includes the selected portion of content 400 (e.g., "Business Goals: Achieve total revenue over $4 million in fiscal year 2013; Register over 8,900 new customers in FY 2013; Receive over 19,000 lead referrals in FY 2013") from the collaborative text document 115 and excludes other content in the collaborative text document 115. Accordingly, a user may granularly pick and choose which content to build slides 111 for and view the collaborative slide presentation 113 including the slides 111 as it is built in the sidebar presentation tool 204, while also viewing one or more collaborative text documents 115 used for source material. The slide 111 includes a layout template of "Title plus Body" because the portion of content 400 has a format type of header ("Business Goals") and body text associated with the header. In some embodiments, the sidebar presentation tool 204 may remain visible when the user opens a different collaborative text document 115 in the same user interface 124A to enable the user to build the collaborative slide presentation 113 including slides 111 with content from numerous different collaborative text documents 115 without having to switch between different user interfaces and/or application instances (e.g., word processing applications).

In some embodiments, the user may edit the slides 111 included in the sidebar presentation toolbar 204 in the first portion 206 of the user interface 124A that is displayed together with the collaborative text document 115 in the second portion 208. For example, the user may change aspects to the font (e.g., color, type, size, etc.), background (e.g., color), and so forth, directly in the slide displayed in the first portion 206 while the collaborative text document 115 is displayed in the second portion 208 of the user interface 124A without having to open another application in a different user interface.

Further, in some embodiments, the user may use the sidebar presentation tool 204 to add slides to an existing collaborative slide presentation 113 using, for example, option 210 provided by the user interface 124A. In another embodiment, the user may save the one or more slides 111 of the collaborative slide presentation 113 in the sidebar presentation tool 204 as a new collaborative slide presentation 113 in the data store 114 using, for example, option 212 in the user interface 124A. Upon creating a new collaborative slide presentation 113, a separate collaborative slide presentation application may be launched that displays the created collaborative slide presentation 113.

Figure 4C:
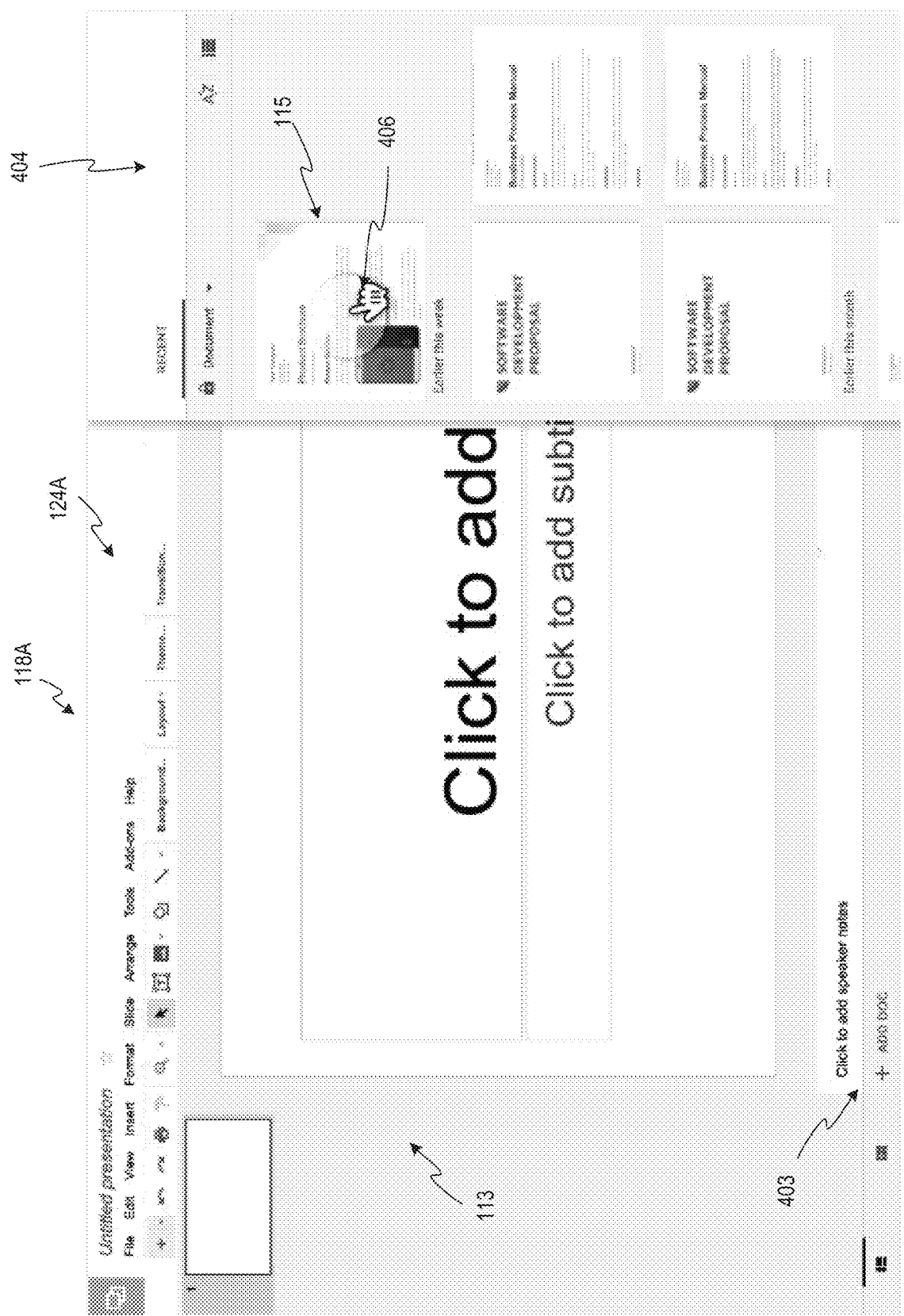
FIG. 4C depicts the user interface of the collaborative multi-content application displaying a new slide presentation and an option to open a collaborative text document in the user interface, in accordance with one implementation of the disclosure.

FIG. 4C depicts the user interface 124A of the collaborative multi-content application 118A displaying a new slide presentation 113 and an option 403 to open a collaborative text document 115 in the user interface 124A, in accordance with one implementation of the disclosure. As depicted in this example, the user may initially select to view the new slide presentation 113 in the user interface 124A. Also, the user may select the option 403 (e.g., button, link, etc.) to add a collaborative text document 115 to the user interface. Upon selecting the option 403, a graphical element, such as a file menu 404, may be displayed that includes various available collaborative text document 115 that are available to open by the collaborative multi-content application 118A. The user may select one of the collaborative text documents 115, as shown by hand icon 406. Although, one collaborative text document 115 is shown as being open for explanatory purposes, it should be understood that any suitable number (e.g., 1, 2, 3, 4, 5) may be open and toggled between being visible in the user interface 124A to select content for which to generate slides. Thus, a user may generate slides using content from multiple collaborative text documents 124A in a single user interface 124A.

Figure 4D:
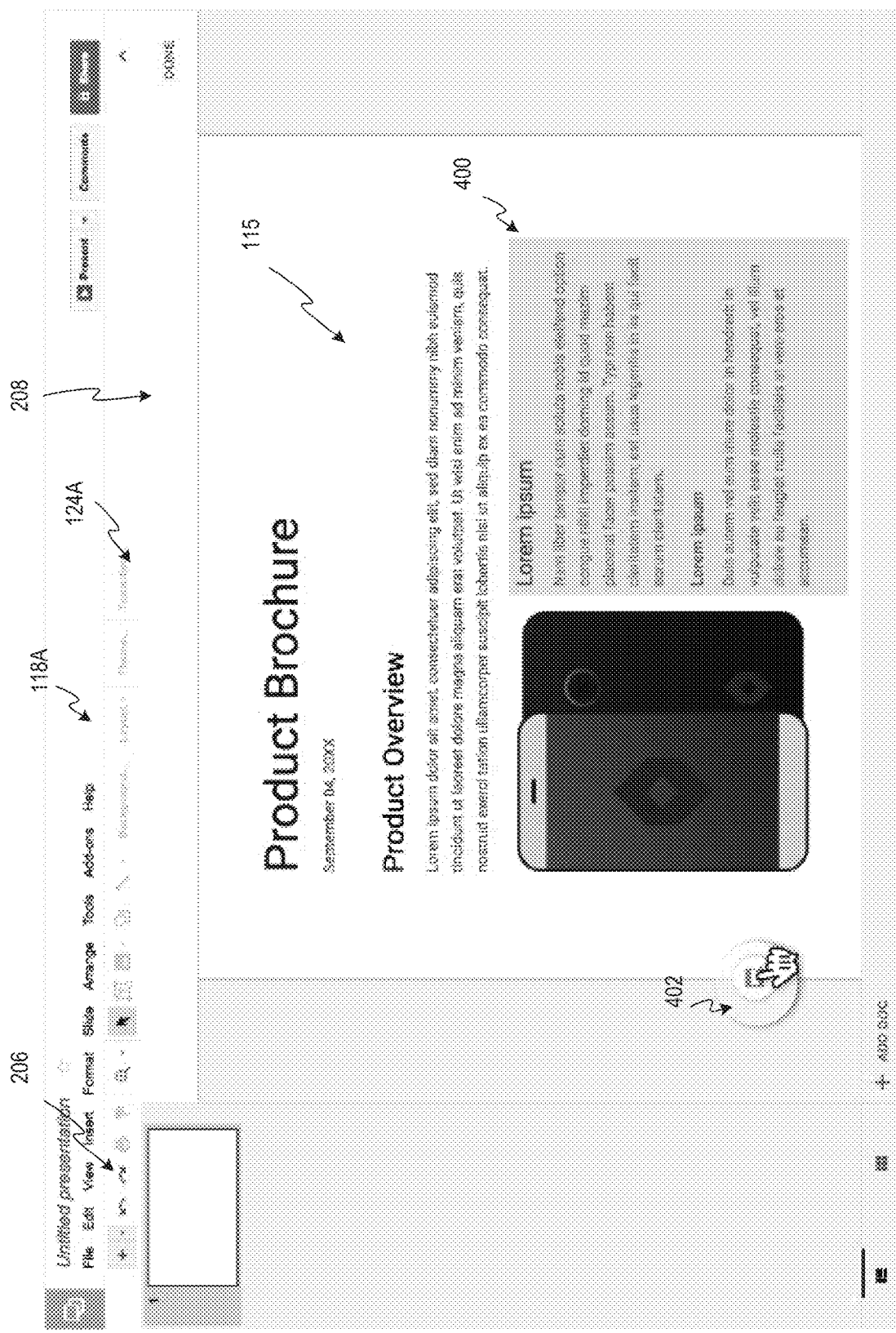
FIG. 4D depicts the user interface of the collaborative multi-content application displaying a slide in a first portion of the user interface and the selected content of the collaborative text document in a second portion of the user interface, in accordance with one implementation of the disclosure.

In response to selecting the collaborative text document 115, the user interface 124A may be updated to display the slide presentation 113 in the first portion 206 of the user interface 124A together with the collaborative text document 115 in the second portion 208 of the user interface, as depicted in FIG. 4D. The user may select a portion of content 400 in the collaborative text document 115 displayed in the user interface 124A. Upon the user selecting the portion of content 400, one or more graphical elements (e.g., buttons, option menu, etc.) may appear in the user interface 124A. Alternatively, the user may actuate a button of an input peripheral (e.g., right clicking a mouse button) to cause the graphical elements to appear. The graphical elements may be associated with the selected portion of content 400 and provide various options for the selected portion of content 400. For example, a graphical element 402 may include an option for creating a slide 111 based on the selected portion of content 400. Selecting the graphical element 402 may send a request to the collaborative multi-content application 118A to generate a slide 111 for the selected portion of content 400. The collaborative multi-content application 118A may generate one or more slides 111 based on the selected portion of content 400 and return the generated one or more slides. In another embodiment, as described further below, when the user causes the collaborative multi-content application 118A to enter a certain mode (e.g., selecting mode), simply selecting (e.g., highlighting) the content 400 in the collaborative text document 115 may cause one or more slides to be generated for the selected content.

Figure 4E:
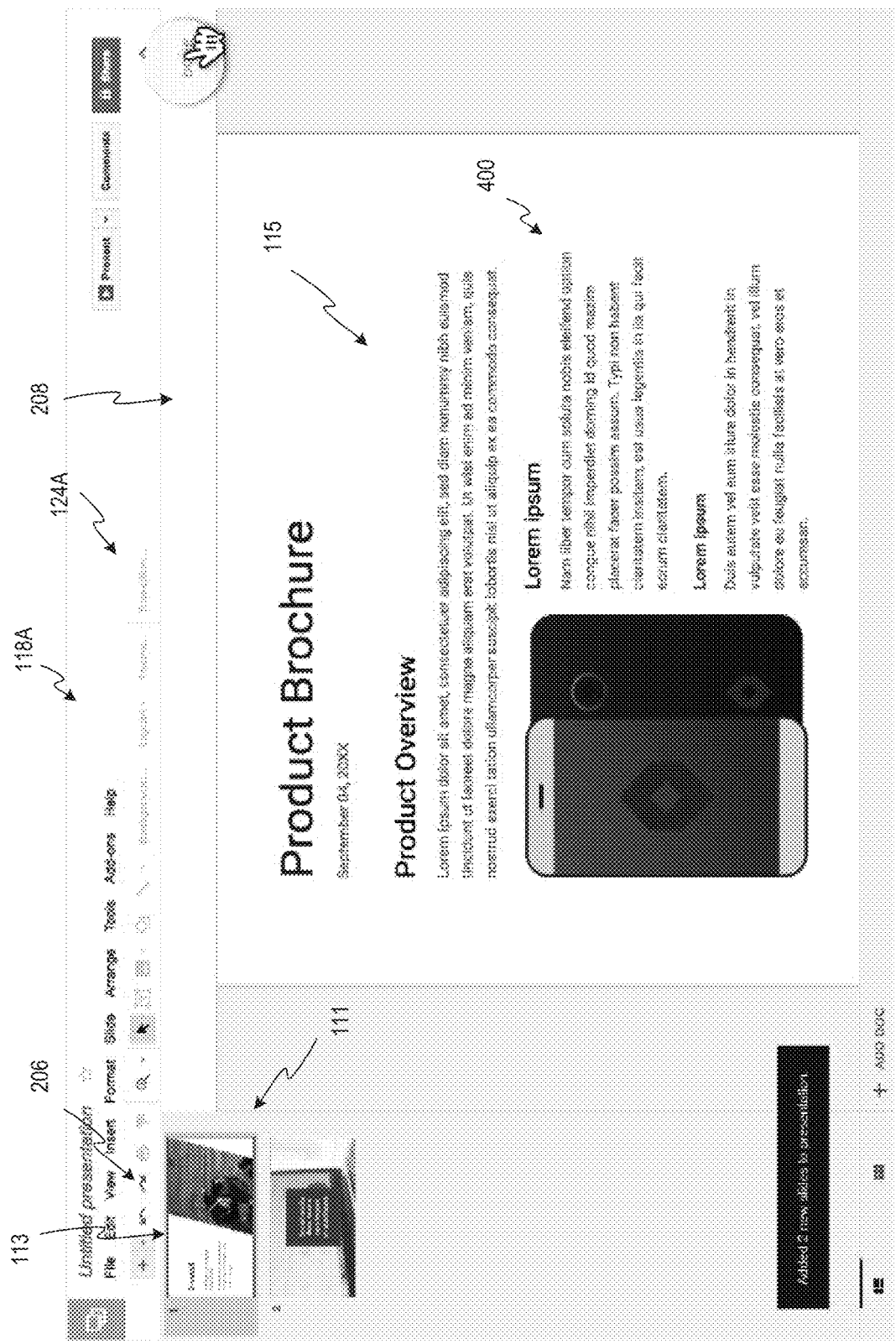
FIG. 4E depicts the user interface of the collaborative multi-content application displaying slides generated from the selected content of FIG. 4D, in accordance with one implementation of the disclosure.

FIG. 4E depicts the user interface 124A of the collaborative multi-content application 118A displaying slides 111 generated from the selected content 400 of FIG. 4D, in accordance with one implementation of the disclosure. As depicted, the user interface 124A presents the slides 111 in the first portion 206 of the user interface 124A while continuing to display the collaborative text document 115 in the second portion 208 of the user interface 124A. Presenting the slides 111 of the collaborative slide presentation 113 together with the collaborative text document 115 in a single user interface 124A may enhance computing speed and/or reduce memory usage by the user avoiding opening numerous different applications in different user interfaces.

The slides 111 may include the selected portion of content 400 from the collaborative text document 115 and excludes other content in the collaborative text document 115. Accordingly, a user may granularly pick and choose which content to build slides 111 for and view the collaborative slide presentation 113 including the slides 111 as it is built in the user interface 124A, while also viewing one or more collaborative text documents 115 used for source material. In some embodiments, the user may edit the slides 111 in the first portion 206 of the user interface 124A that is displayed together with the collaborative text document 115 in the second portion 208. For example, the user may change aspects to the font (e.g., color, type, size, etc.), background (e.g., color), and so forth, directly in the slide displayed in the first portion 206 while the collaborative text document 115 is displayed in the second portion 208 of the user interface 124A without having to open another application in a different user interface.

Figure 5:
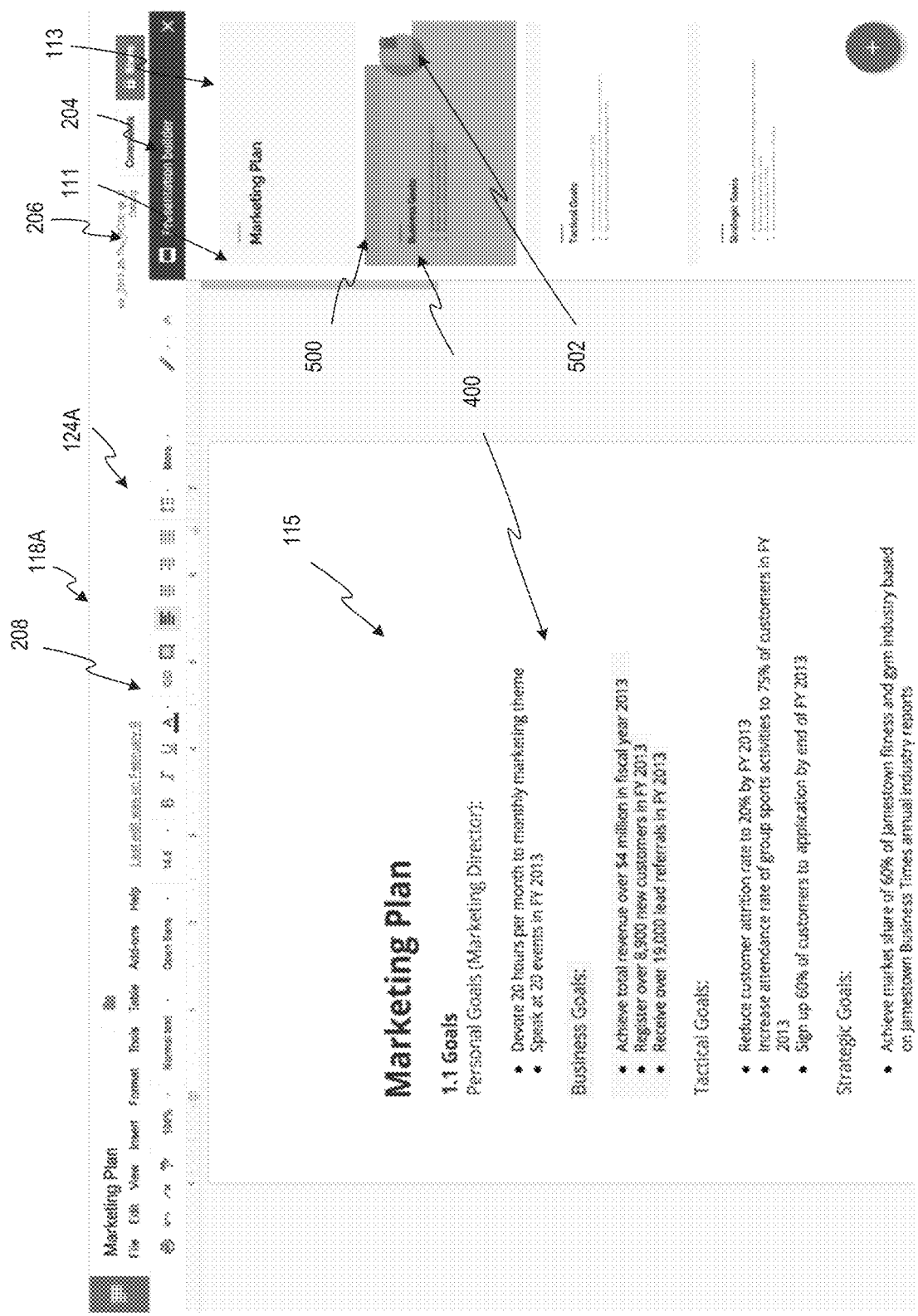
FIG. 5 depicts a user interface of the collaborative multi-content application displaying the sidebar presentation tool including an option to delete a selected slide and the collaborative text document including highlighted content associated with the selected slide, in accordance with one implementation of the disclosure.

FIG. 5 depicts a user interface 124A of the collaborative multi-content application 118A displaying the sidebar presentation tool 204 including an option to delete a selected slide 500 and the collaborative text document 115 including highlighted content 400 associated with the selected slide, in accordance with one implementation of the disclosure. As depicted, the collaborative slide presentation 113 including one or more generated slides 111 are displayed in the sidebar presentation tool 204 in the first portion of the user interface 124A together with the collaborative text document 115 in the second portion of the user interface 124A. The user may select the selected slide 500 and the selected slide 500 may be highlighted, as depicted in the sidebar presentation tool 204.

Upon selecting the slide 500, the portion of content 400 that was used to generate the selected slide 500 may be highlighted in the collaborative text document 115. This may aid a user in identifying the information in source materials that was used to generate the various slides 111. Further, upon selecting the slide 500, an option 502 (e.g., graphical element, such as a button) to delete the selected slide 500 may be provided for the slide 500 in the sidebar presentation tool 204. If the user selects the option 500, the select slide 500 may be deleted from the collaborative slide presentation 113. As such, the user interface 124A may be modified to display the remaining slides 111 of the sidebar presentation tool 204 in the first portion 206 of the user interface 124A while continuing to display the collaborative text document 115 in the second portion 208 of the user interface 124A.

Figure 6:
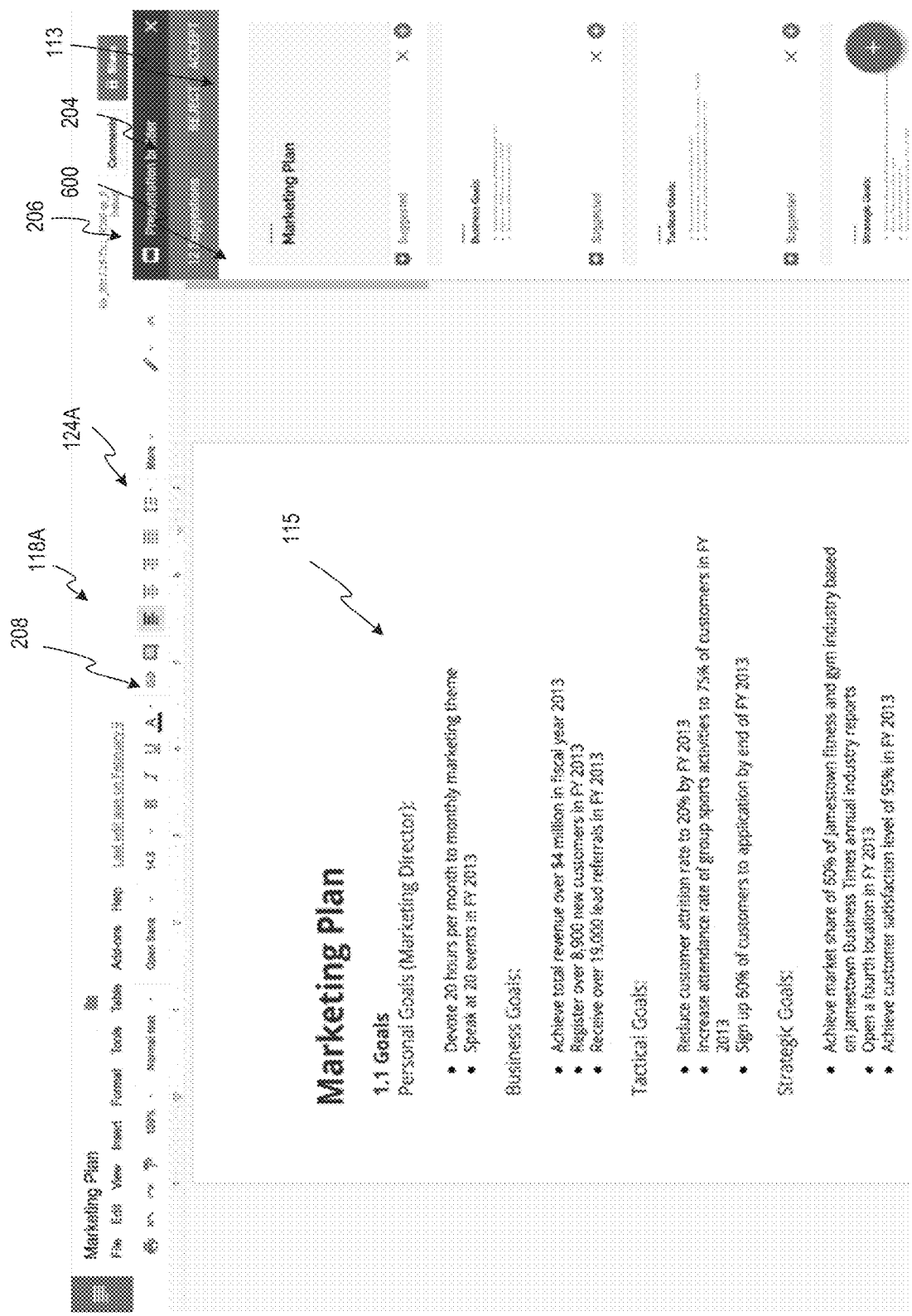
FIG. 6 depicts a user interface of the collaborative multi-content application displaying the sidebar presentation tool including suggested slides generated based on content in the collaborative text document, in accordance with one implementation of the disclosure.

FIG. 6 depicts a user interface of the collaborative multi-content application 118A displaying the sidebar presentation tool 204 including suggested slides 600 generated based on content in the collaborative text document 115, in accordance with one implementation of the disclosure. In some embodiments, if the user opens the collaborative text document 115, the collaborative multi-content application 118A may generate a number of suggested slides 600 based on the content in the collaborative text document 115 that is open. The user may not provide any input besides opening the collaborative text document 115.

As depicted, the suggested slides 600 may be displayed in the sidebar presentation tool 204 in the first portion 206 of the user interface 124A together with the collaborative text document 115 in the second portion 208 of the user interface 124A. The sidebar presentation tool 204 may provide an option to accept and an option to rejection each of the suggested slides 600. If the user selects to accept the suggested slide 600, the suggested slide 600 may be added to the collaborative slide presentation 113. If the user selects to reject the suggested slide 600, the suggested slide 600 may be removed from the collaborative slide presentation 113.

Figure 7:
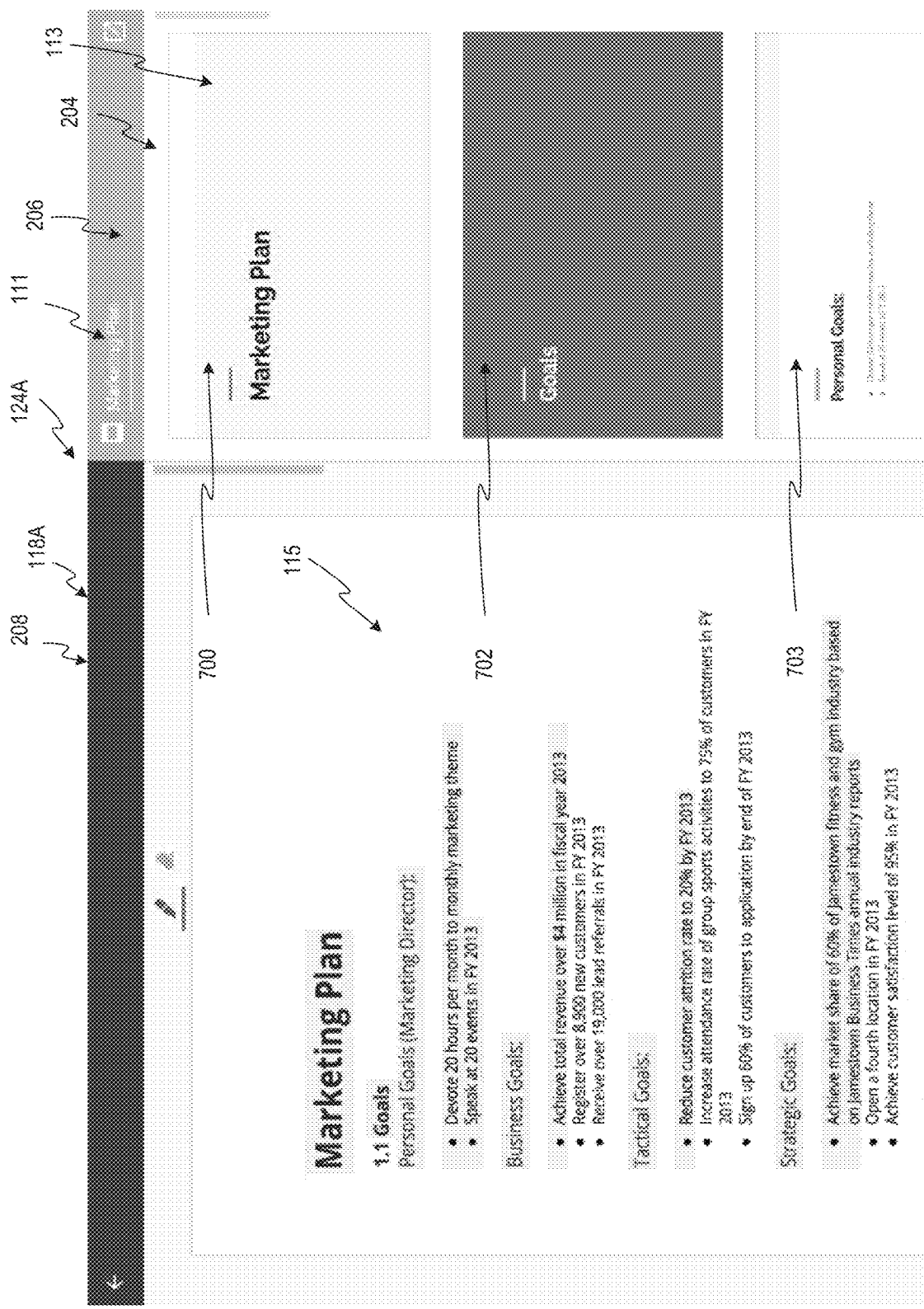
FIG. 7 depicts a user interface of the collaborative multi-content application operating in a selecting mode to generate slides based on selected content, in accordance with one implementation of the disclosure.

FIG. 7 depicts a user interface 124A of the collaborative multi-content application 118A operating in a selecting mode to generate slides 111 based on selected content, in accordance with one implementation of the disclosure. Any selections of content in the collaborative text document 115 that are made in collaborative text document 115 displayed in the first portion 208 of the user interface 124A while the collaborative multi-content application 118A is operating in the selecting mode may cause the slides 111 to be generated based on the selected content and dynamically displayed in the second portion 206 of the user interface 124A. As depicted, numerous slides 111 are generated based on the selected content. The slides 111 are generated based on the format type of the selected text in the collaborative text document 115. For example, a first slide 700 having a "Title" layout template is generated for a selected portion of content that is the title ("Marketing Plan") of the collaborative text document 115. A second slide 702 having a "Section Header" layout template is generated for a selected portion of content that is a section header ("Goals") without associated body text. A third slide 703 is generated having a "Title plus Body" layout template is generated for a selected portion of content that includes a header ("Personal Goals") and associated text.

Figure 8A:
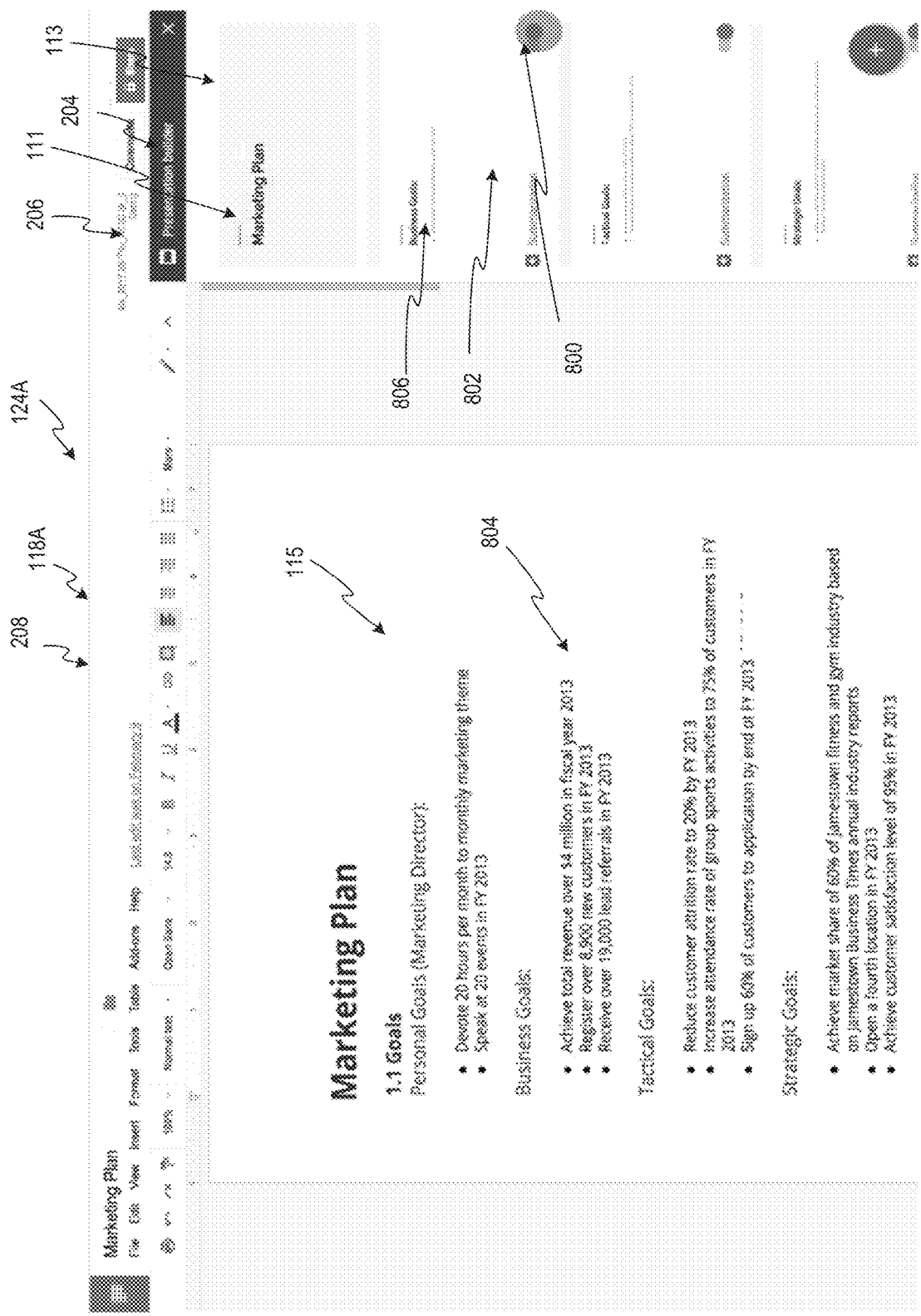
FIG. 8A depicts a user interface of the collaborative multi-content application displaying the sidebar presentation tool including an option to distill content for each slide, in accordance with one implementation of the disclosure.

FIG. 8A depicts a user interface 124A of the collaborative multi-content application 118A displaying the sidebar presentation tool 204 including a summarization option 800 to distill content for each slide 111 in the collaborative slide presentation 113, in accordance with one implementation of the disclosure. Some of the slides 111 may have the summarization option 800 enabled, while other slides 111 have the summarization option 800 disabled. In some instances, the option 800 may include a slider, a radio button, a checkbox, etc. The summarization option 800 may be defaulted to enabled, as displayed. In some embodiments, the summarization option 800 may only be displayed for slides 111 having a particular layout template, such as "Title plus Body". For example, a slide having a layout template of "Title" may not display the summarization option 800 because there may not be any content to distill in the slide 111.

When the summarization option 800 is enabled, the respective slide 111 may include a lesser amount of content than the portion of content used to generate that particular slide from the collaborative text document 115. For example, summarization option 800 for slide 802 is enabled. Accordingly, the collaborative multi-content application 118A may apply the machine learning model 116 or the rules 119 to the content 804 (Achieve total revenue over $4 million in fiscal year 2013; Register over 8,900 new customers in FY 2013; Receive over 19,000 lead referrals in FY 2013) used to generate the slide 802. The content 804 may be reduced from a first number of sentences (e.g., 3) to a second lesser number of sentences (e.g., 1) to generate distilled content 806 (Achieve total revenue over $4 million in fiscal year 2013) that is included in the slide 802 as a result of distilling.

Figure 8B:
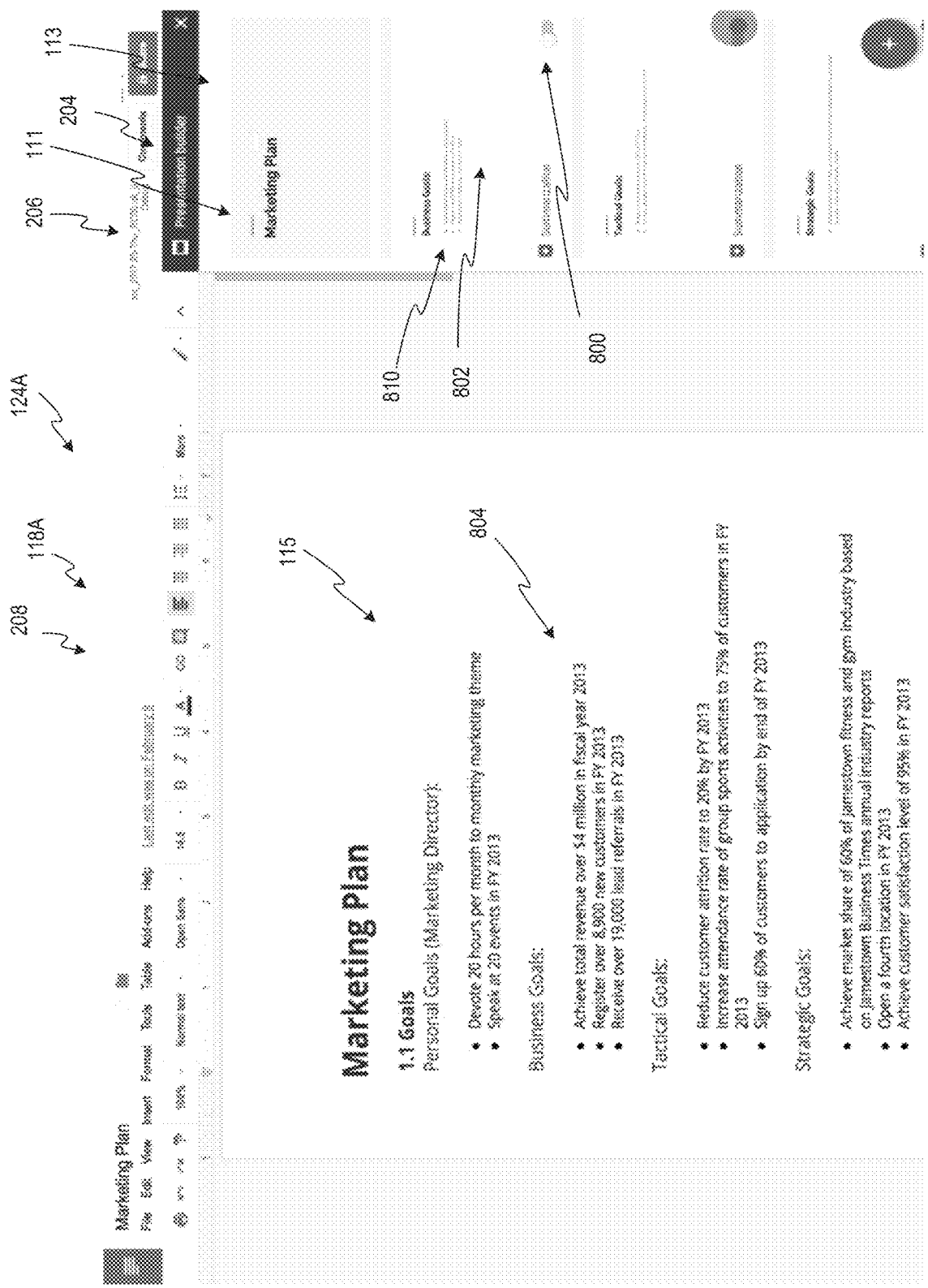
FIG. 8B depicts a user interface of the collaborative multi-content application displaying the sidebar presentation tool including a deactivated option to distill content for one of the slides, in accordance with one implementation of the disclosure.

FIG. 8B depicts a user interface 124A of the collaborative multi-content application 118A displaying the sidebar presentation tool 204 including a deactivated summarization option 800 to distill content for the slide 802, in accordance with one implementation of the disclosure. The user may select to disable the summarization option 800 and the user interface 124A may be modified to increase the amount of content in the associated slide 806 from a first amount (e.g., 1 sentence) to a second greater amount (e.g., 3 sentences), resulting in un-distilled content 810, in the slide 802. The user interface 124A may be modified to display the un-distilled content 810 in the slide 802 in the first portion 206 of the user interface 124A while continuing to display the collaborative text document 115 in the second portion 208 of the user interface 124A. The un-distilled content 810 (Achieve total revenue over $4 million in fiscal year 2013; Register over 8,900 new customers in FY 2013; Receive over 19,000 lead referrals in FY 2013) may match the content 804 (Achieve total revenue over $4 million in fiscal year 2013; Register over 8,900 new customers in FY 2013;

Receive over 19,000 lead referrals in FY 2013) in the collaborative text document 115 that was used to generate the slide 802.

Figure 9:
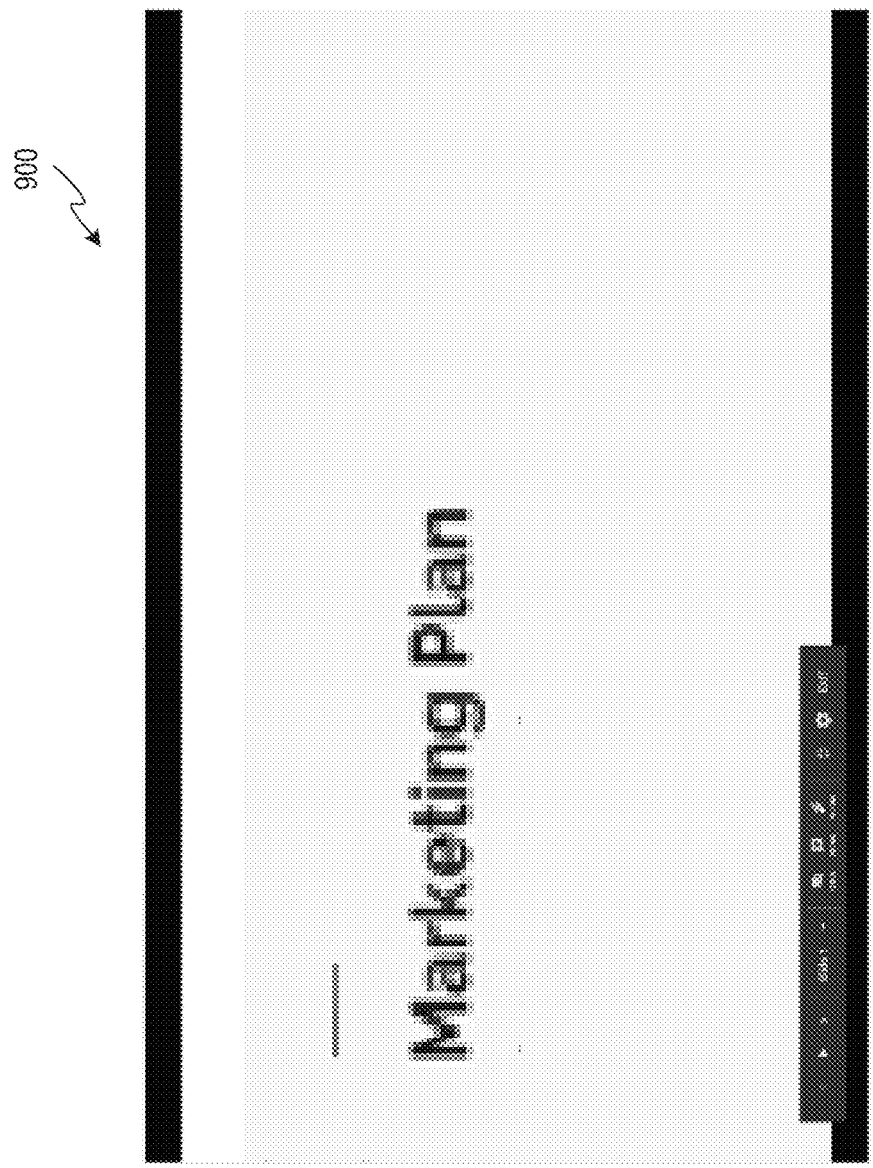
FIG. 9 depicts a display mode of the collaborative multi-content application responsive to a user selecting to display the slide presentation in the sidebar presentation tool, in accordance with one implementation of the disclosure.

FIG. 9 depicts a presentation mode 900 of the collaborative multi-content application 118A responsive to a user selecting to display the slide presentation 113 in the sidebar presentation tool 204, in accordance with one implementation of the disclosure. The user may select to enter the presentation mode via an option included in the sidebar presentation tool 204 in the first portion 206 of the user interface 124A. Upon entering presentation mode 900, the user interface 124A may be updated to display a first slide 111 of the one or more slides 111 full-screen in a slideshow. The user may advance to a second slide using an option provided by the presentation mode 900 or the slide presentation 113 may advance to a second slide after a predefined amount of time. The user may use various options to scroll back and forth between slides 111 in the presentation mode 900. The presentation mode 900 may enable a user to preview how the slide presentation 113 may look on a larger scale.

Figure 10:
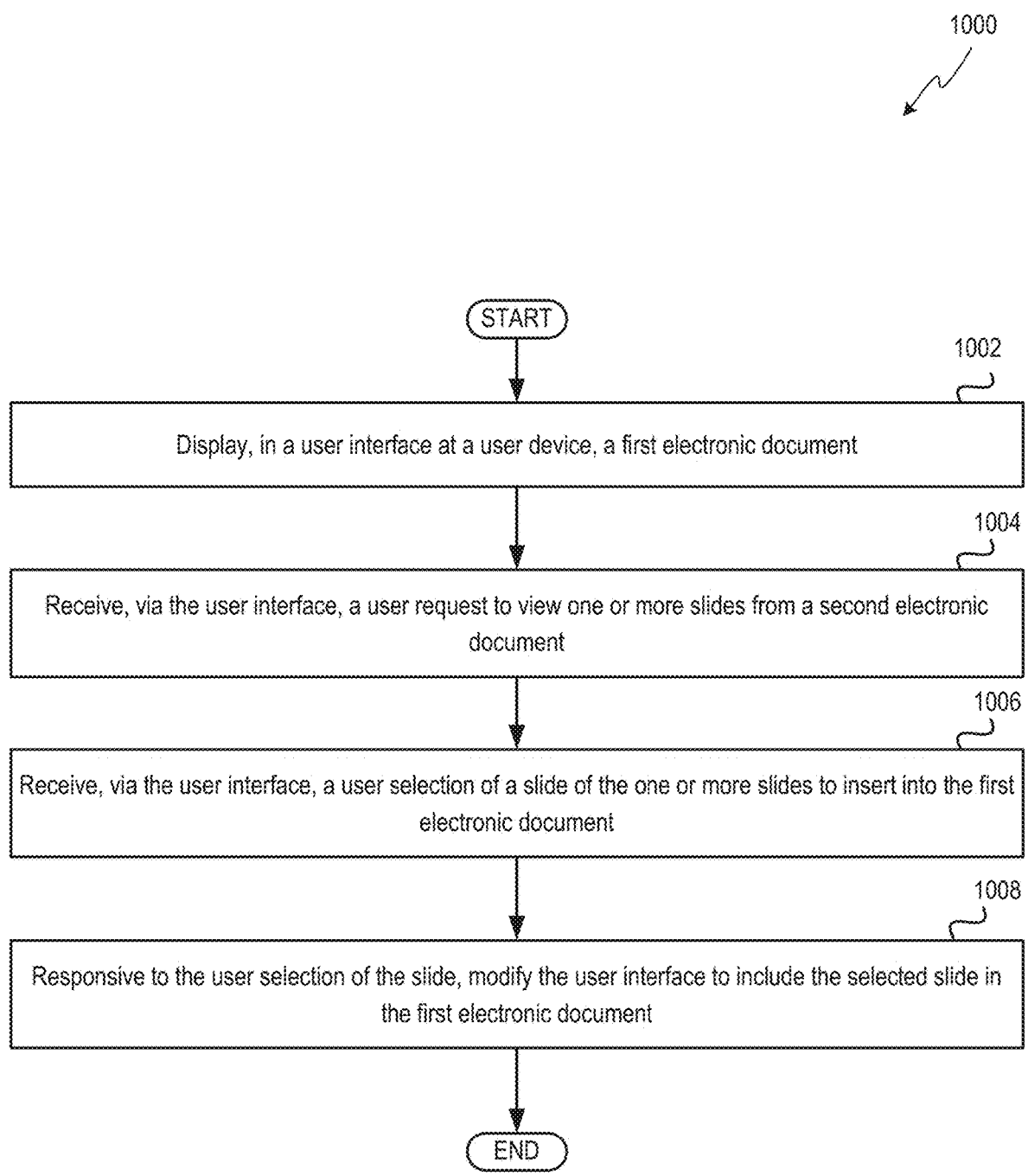
FIG. 10 depicts a flow diagram of aspects of a method for displaying a collaborative text document including an inserted slide in a user interface, in accordance with one implementation of the disclosure.

FIG. 10 depicts a flow diagram of aspects of a method 1000 for displaying a collaborative text document 115 including an inserted slide 111 in a user interface 124A, in accordance with one implementation of the disclosure. Although the user interface 124A is used for discussion of method 1000, it should be understood that any other user interface 124B-124Z may be used, instead of or in addition to the user interface 124A. Method 1000 may be performed in the same or a similar manner as described above in regards to method 200. In one implementation, method 1000 may be performed by one or more processing devices of the user device 120A-120Z displaying the user interface 124A-124Z of the collaborative multi-content application 118A.

At block 1002, the processing device may display, in a user interface 124A at a user device 120A, a first electronic document. In some embodiments, the first electronic document may be a collaborative text document 115. The user interface 124A displaying the first electronic document may be received from the collaborative multi-content application 118A in response to a request to view the first electronic document.

At block 1004, the processing device may receive, via the user interface 124A, a user request to view one or more slides 111 from a second electronic document. In some embodiments, the second electronic document may include a slide presentation 113 (e.g., collaborative or non-collaborative). In some embodiments, the request to view the slides 111 may include the user accessing a file dropdown menu in the user interface 124A. The file dropdown menu may provide various options of slides 111 having different layout templates, styles, themes, content, etc. to select from. In some embodiments, the request to view the slides 111 may include the user selecting content of the first electronic document and requesting that the slides 111 be generated and displayed in the sidebar presentation tool 204 in the user interface 124A.

At block 1006, the processing device may receive, via the user interface 124A, a user selection of a slide 111 of the one or more slides 111 to insert into the first electronic document. The user selection may include selecting the slide from the file dropdown menu or from the sidebar presentation tool 204, as discussed further below. For example, the user selection of the slide may include the user using an input peripheral to selecting the slide being displayed in the first portion 206 of the user interface 124A, dragging the slide, and dropping the slide at a location in the first electronic document being displayed in the second portion 208 of the user interface 124A. The user selection may cause the collaborative multi-content application 118A to insert the selected slide into the first electronic document. The slide may have a particular data type and/or file type that enables inserting it into the first electronic document.

At block 1008, the processing device may, responsive to the user selection of the slide 111, modify the user interface 124A to include the selected slide in the first electronic document. The selected slide may be inserted at any suitable location (e.g., at a location where a cursor was located in the first electronic document when the user selection of the slide was made). In some embodiments, the inserted slide may be edited in-line in the first electronic document. Accordingly, the processing device may receive an edit to the slide 111 in-line in the first electronic document in the user interface 124A. The processing device may also modify the user interface 124A to include the slide 111 with the edit in the first electronic document.

In some embodiments, the slides 111 inserted in the first electronic document may be associated with one another as part of a collaborative slide presentation 113. The user may select an option from the user interface 124A to launch a presentation mode displaying a slideshow of the slides 111 of the collaborative slide presentation 113 included in the first electronic document. This feature may enable previewing what the final slide presentation 113 may look like as the user adds more slides to the first electronic document. Another option in the user interface 124A may enable the user to add the slides 111 included in the first electronic document to an existing slideshow or to save the slides 111 as a new slide presentation 113 in the data store 114.

Figure 11:
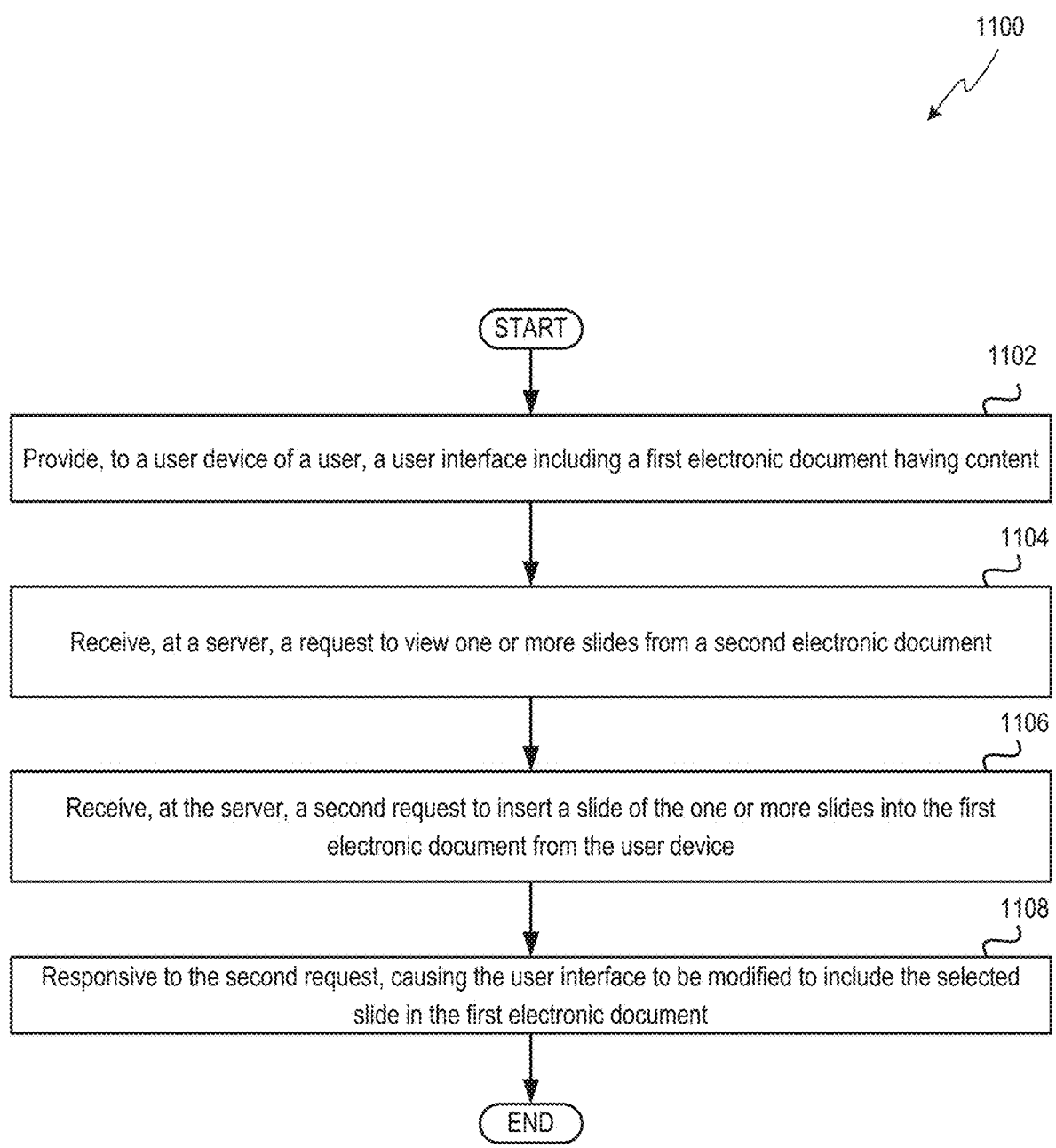
FIG. 11 depicts a flow diagram of aspects of a method for inserting a slide into a collaborative text document, in accordance with one implementation of the disclosure.

FIG. 11 depicts a flow diagram of aspects of a method 1100 for inserting a slide 111 into a collaborative text document 115, in accordance with one implementation of the disclosure. Although the user interface 124A is used for discussion of method 1100, it should be understood that any other user interface 124B-124Z may be used, instead of or in addition to the user interface 124A. Method 1100 may be performed in the same or a similar manner as described above in regards to method 200. In one implementation, one or more of the operations described with reference to method 1100 may be performed by collaborative multi-content application 118A-118Z executed by one or more processing devices of the server 112A-112Z.

At block 1102, the processing device may provide, to a user device 120A of a user, a user interface 124A including a first electronic document having content. In some embodiments, the first electronic document may be a collaborative text document 115 and the content may include text, images, tables, etc.

At block 1104, the processing device may receive a request to view one or more slides from a second electronic document. In some embodiments, the second electronic document may include a collaborative slide presentation 113. In one embodiment, the processing device may provide the slides to be displayed in the user interface 124A (e.g., in a file dropdown menu). The slides may include layout templates including placeholders without content, slides generated based on content in the first electronic document, or any suitable slide. Upon insertion in the first electronic document, the user may edit the slide to include the desired content. In another embodiment, the request to view one or more slides may include a request to generate one or more slides based on content selected from the first electronic document displayed in the user interface 124A. The processing device may generate the slides 111 and provide the slides for display in the user interface 124A in the first portion 206 of the user interface 124A while continuing to display the first electronic document in the second portion 208 of the user interface 124A.

At block 1106, the processing device may receive a request to insert a slide 111 of the one or more slides 111 into the first electronic document from the user device 120A. The request may include location information of where to insert the slide into the document and/or an identifier of the selected slide, among other things. The processing device may insert the selected slide into the first electronic document based on the location information.

At block 1108, the processing device may, responsive to the request, cause the user interface 124A to be modified to include the selected slide 111 in the first electronic document. The processing device may also receive, from the user device 120A, an edit to the slide 111 included in the first electronic document. The processing device may apply the edit to the slide 111 in the first electronic document. Also, the processing device may cause the user interface 124A to be modified to include the slide 111 with the edit in the first electronic document.

Figure 12A:
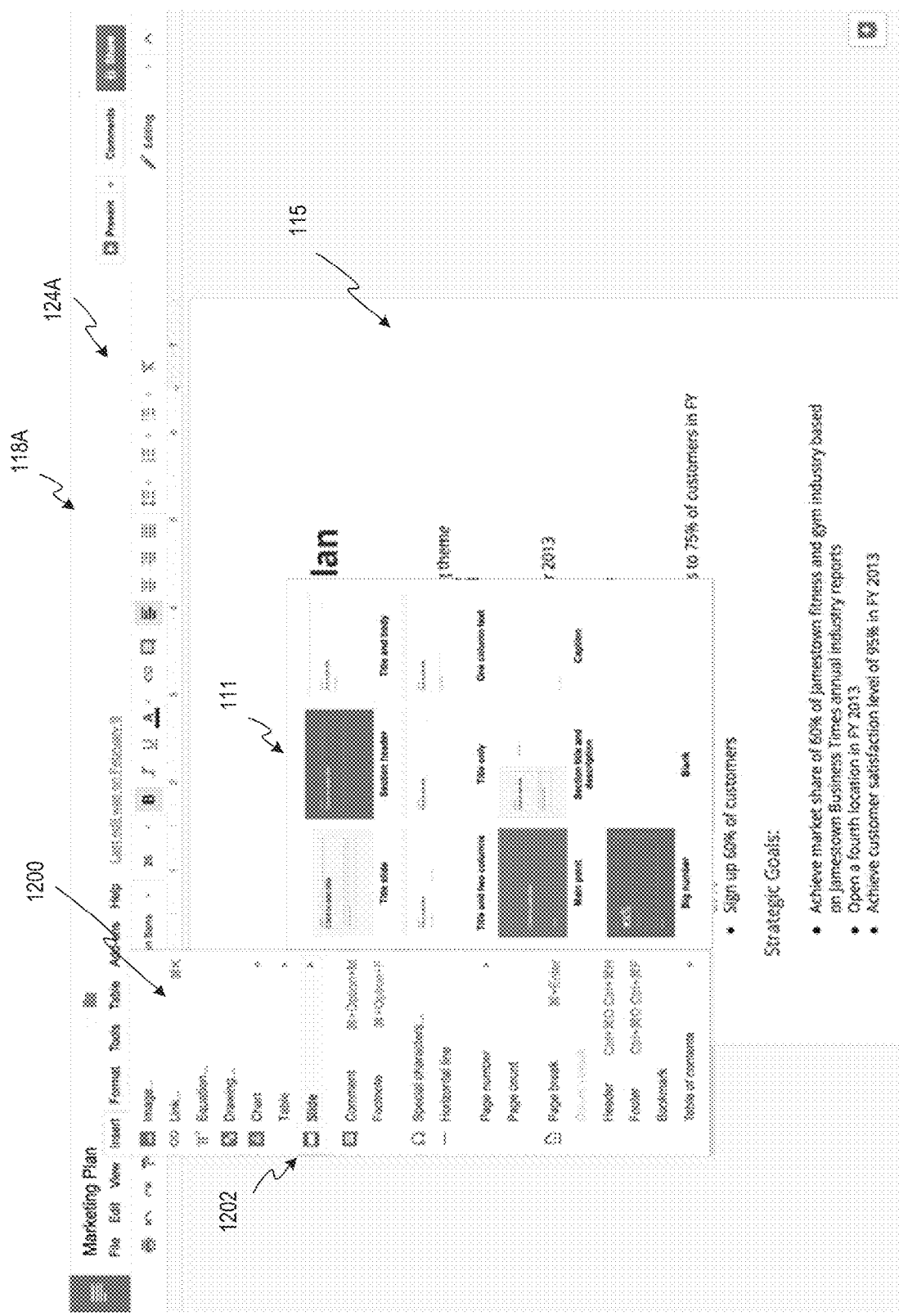
FIG. 12A depicts the user interface of the collaborative multi-content application displaying a dropdown menu including options to insert slides into a collaborative text document, in accordance with one implementation of the disclosure.

FIG. 12A depicts the user interface 124A of the collaborative multi-content application 118A displaying a dropdown menu 1200 including options to insert slides 111 into a collaborative text document 115 (first electronic document), in accordance with one implementation of the disclosure. As depicted, the dropdown menu 1200 for "Insert" includes an option 1202 to display slides 111 from a slide presentation (second electronic document) that are available for insertion into the first electronic document. The slides 111 may include layout templates for various types of slides (e.g., title, section header, title and body, title and two columns, title only, one column text, main point, section title and description, caption, big number, blank). In some embodiments, the slides 111 may include slides generated based on content in the collaborative text document 115. In some embodiments, the sidebar presentation tool 204 may display various slides 111 that are generated based on content in the collaborative text document 115, and the user may select (e.g., drag and drop, double click, right click and choose an option to insert, etc.) one of the slides 111 into the collaborative text document 115 to insert the selected slide into the collaborative text document 115. The user may select a desired slide in view of the content at a particular section of the collaborative text document 115 and the slide may be inserted directly into the collaborative text document 115 at that section (e.g., based on the location of a cursor). This may enable an enhanced user interface 124A that displays the slides 111 in collaborative text document 115 to provide context as to what is included in the slides 111 and may help the user visualize how the content in the collaborative text document 115 is organized into a slide presentation 113.

Figure 12B:
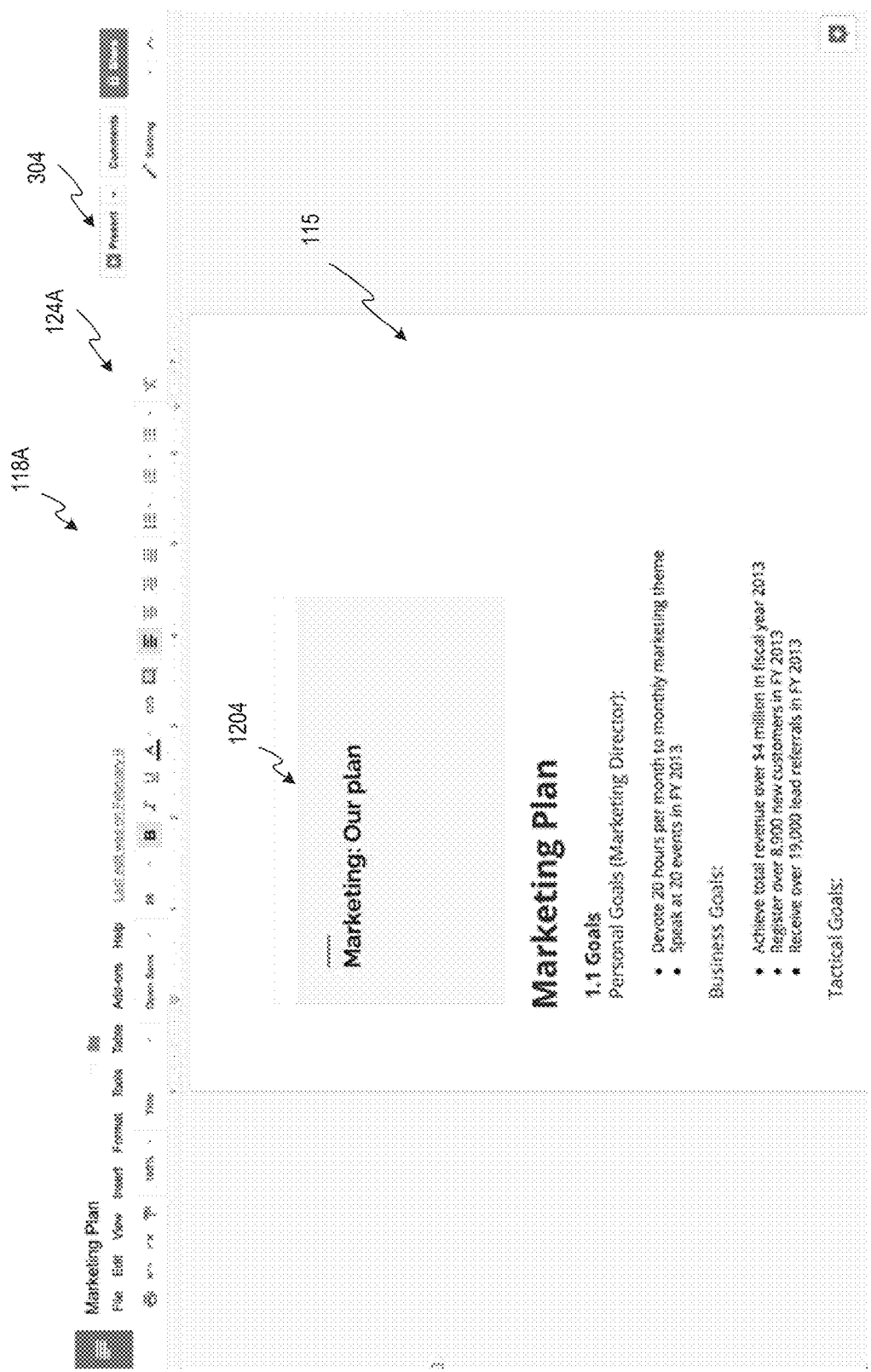
FIG. 12B depicts the user interface of the collaborative multi-content application displaying a collaborative text document including an inserted slide, in accordance with one implementation of the disclosure.

For example, FIG. 12B depicts the user interface 124A of the collaborative multi-content application 118A displaying a collaborative text document 115 including an inserted slide 1204, in accordance with one implementation of the disclosure. As depicted, the user selected a slide 1204 having a layout template of "Title." The slide 1204 is inserted directly into the collaborative text document 115 and the slide may be editable to the user in-line in the collaborative text document 115. For example, the user can modify the placeholder for the title in the slide 1204 to "Marketing: Our Plan".

In some embodiments, the content of the slide may be automatically populated. For example, the collaborative multi-content application 118A may receive the request for the slide insertion and, based on the layout template selected, may determine which content to include in the slide. For example, since the user selected the slide with a layout template of "Title," the multi-content module 118A may parse the content of the collaborative text document 116 relative to the desired insertion location for the slide to find content having formatting of a title. In the depicted example, the nearest content having formatting related to a title is "Marketing Plan." Accordingly, the collaborative multi-content application 118A may generate a slide having the layout template of "Title" and setting the title to "Marketing Plan".

In some embodiments, a present graphical element 304 (e.g., button) may be displayed in any suitable location in the user interface 124A of the collaborative multi-content application 118A. The present graphical element 304 may cause the user interface 124A to be modified to display a slide presentation of the slides 111 included in the collaborative text document 115 in a preview pane (e.g., full-screen or a portion of the screen). The slide presentation may present the slides 206 that are inserted in the collaborative text document 115 in slideshow fashion where a single slide is displayed at a time.

Figure 13A:
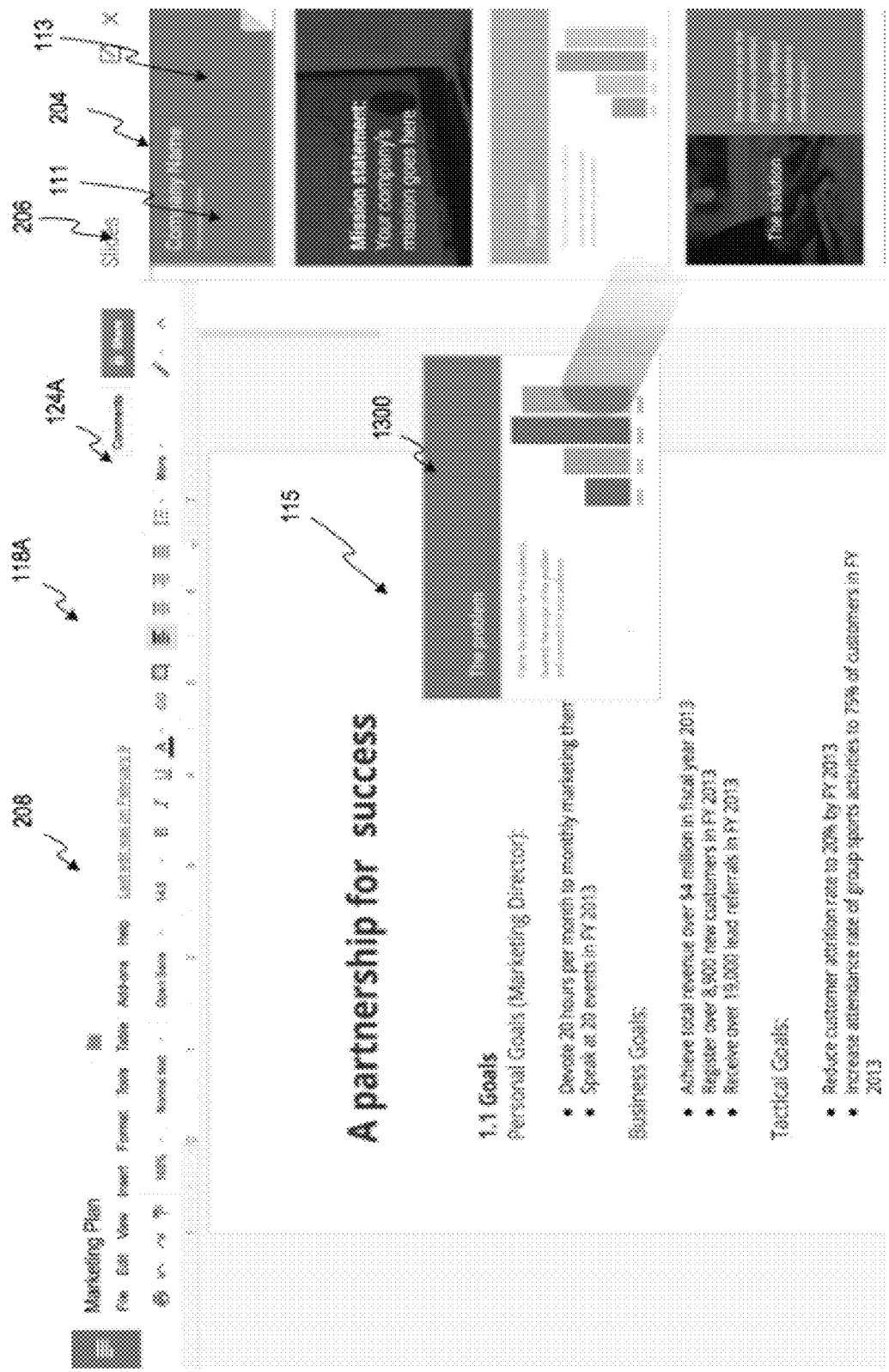
FIG. 13A depicts the user interface of the collaborative multi-content application displaying the sidebar presentation tool from which a user may insert a slide into a collaborative text document, in accordance with one implementation of the disclosure.

FIG. 13A depicts the user interface 124A of the collaborative multi-content application 118A displaying the sidebar presentation tool 204 from which a user may insert a slide 1300 into a collaborative text document 115 (first electronic document), in accordance with one implementation of the disclosure. As depicted, the user interface 124A includes one or more slides 111 (that may or may not have been generated based on the content in the collaborative text document 115) of the collaborative slide presentation 113 (second electronic document) displayed in the first portion 206 and the collaborative text document 115 displayed in the second portion 208. A user may select the slide 1300 that they want to insert into the collaborative text document 115, drag the slide 1300 to the desired location in the collaborative text document 115, and release/drop the slide 1300 at the desired location to cause the slide 1300 to be inserted in the collaborative text document 115 by the collaborative multi-content application 118A. In some embodiments, the user may select the slide 1300 and perform another action (e.g., double clicking, right clicking and selecting an option to insert the slide, etc.) using an input peripheral to cause the slide 1300 to be inserted.

Figure 13B:
FIG. 13B depicts the user interface of the collaborative multi-content application displaying the collaborative text document including a slide inserted from the sidebar presentation tool, in accordance with one implementation of the disclosure.

FIG. 13B depicts the user interface 124A of the collaborative multi-content application 118A displaying, in the second portion 208, the collaborative text document 115 including the slide 1300 inserted from the sidebar presentation tool 204 in the first portion 206 of the user interface 124A, in accordance with one implementation of the disclosure. After the slide 1300 is inserted, the user may edit the slide in-line in the collaborative text document 115. Further, the user may select an option to launch the slides included in the collaborative text document 115 in a presentation mode.

Figure 14:
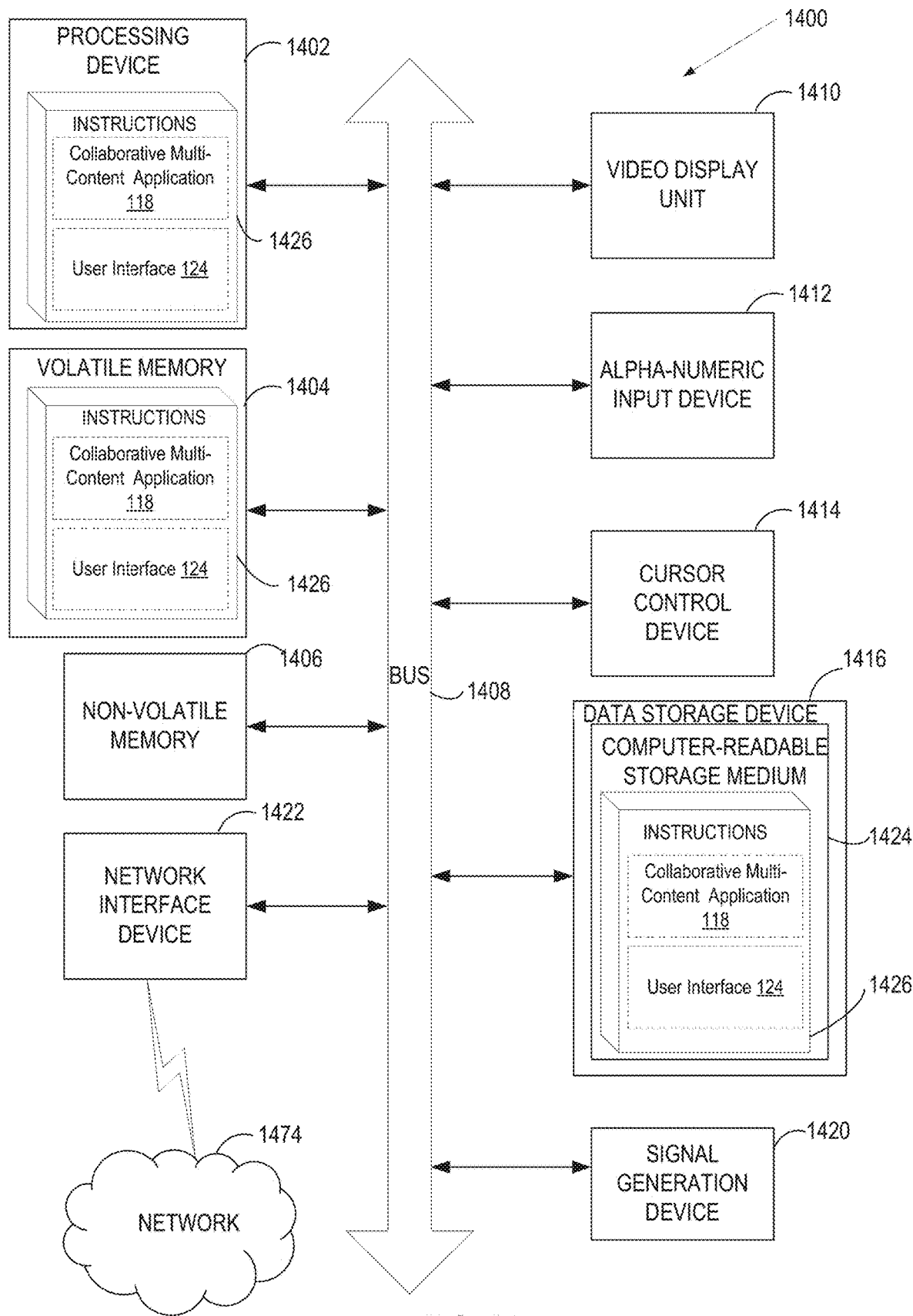
FIG. 14 depicts a block diagram of an example computing system operating in accordance with one or more aspects of the present disclosure.

FIG. 14 depicts a block diagram of an example computing system operating in accordance with one or more aspects of the present disclosure. In various illustrative examples, computer system 1400 may correspond to any of the computing devices within system architecture 100 of FIG. 1. In one implementation, the computer system 1400 may be each of the servers 112A-112Z or the training engine 117. In another implementation, the computer system 1400 may be each of the user devices 120A-120Z.

In certain implementations, computer system 1400 may be connected (e.g., via a network, such as a Local Area Network (LAN), an intranet, an extranet, or the Internet) to other computer systems. Computer system 1400 may operate in the capacity of a server or a client computer in a client-server environment, or as a peer computer in a peer-to-peer or distributed network environment. Computer system 1400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1400 may include a processing device 1402, a volatile memory 1404 (e.g., random access memory (RAM)), a non-volatile memory 1406 (e.g., read-only memory (ROM) or electrically-erasable programmable ROM (EEPROM)), and a data storage device 1416, which may communicate with each other via a bus 1408.

Processing device 1402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1400 may further include a network interface device 1422. Computer system 1400 also may include a video display unit 1410 (e.g., an LCD), an alpha-numeric input device 1412 (e.g., a keyboard), a cursor control device 1414 (e.g., a mouse), and a signal generation device 1420.

Data storage device 1416 may include a non-transitory computer-readable storage medium 1424 on which may store instructions 1426 encoding any one or more of the methods or functions described herein, including instructions implementing the collaborative multi-content application 118 (118A-118Z) and/or the user interface 1242 (124A-124Z) of FIG. 1 for implementing any of the methods described herein.

Instructions 1426 may also reside, completely or partially, within volatile memory 1404 and/or within processing device 1402 during execution thereof by computer system 1400, hence, volatile memory 1404 and processing device 1402 may also constitute machine-readable storage media.

While computer-readable storage medium 1424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method comprising:
   displaying, in a first portion of a user interface on a user device, an electronic document including content, wherein the content comprises at least a first set of content items and a second set of content items;
   receiving a user selection of the first set of content items included within the content of the electronic document being displayed in the first portion of the user interface
   determining, based on at least one of a format or a style of one or more content items of the selected first set of content items, a number of slides to be displayed in a second portion of the user interface; and
   modifying the user interface to include, in the second portion of the user interface, a set of slides comprising the determined number of slides, wherein a first content item of the selected first set of content items is included in a first slide of the set of slides that is associated with at least one of a first format or a first style of the first content item and a second content item of the selected first set of content items is included in a second slide of the set of slides associated with at least one of a second format or a second style of the second content item, and wherein each of the set of slides is displayed in the second portion of the user interface while the user interface continues to display the electronic document including the selected first set of content items and the second set of content items in the first portion of the user interface.

2. The method of claim 1, further comprising:
   receiving an edit, in the second portion of the user interface, to the first slide of the set of slides; and
   responsive to receiving the edit, modifying the user interface to include, in the second portion of the user interface, the first slide with the edit while continuing to display the electronic document including the selected first set of content items in the first portion of the user interface.

3. The method of claim 1, further comprising,
   displaying, in the second portion of the user interface, an option for each of set of slides, wherein the option disables or enables summarization of content included in a respective slide;
   receiving a user selection of the option for the slide of the set of slides to enable summarization of content for the slide; and
   responsive to the user selection of the option, reducing the content in the first slide from a first number of sentences to a second lesser number of sentences.

4. The method of claim 1, further comprising:
   receiving a user selection of the first slide of the set of slides being displayed in the second portion of the user interface; and
   responsive to the user selection of the first slide, modifying the first portion of the user interface to highlight the content item of the selected first set of content items in the electronic document that was used to generate the selected first slide.

5. The method of claim 1, further comprising:
   receiving a user selection of the first slide to delete from the set of slides being displayed in the second portion of the user interface; and
   responsive to the user selection of the first slide to delete, modifying the user interface to display, in the second portion, the set of slides without the selected first slide while continuing to display the electronic document including the selected first set of content items in the first portion of the user interface.

6. The method of claim 1, further comprising:
   receiving a user selection of an option in the user interface to present the set of slides being displayed in the second portion in a presentation mode; and
   presenting the set of slides full-screen in the presentation mode.

7. The method of claim 1, further comprising receiving a user selection of an option in the user interface to enter a selecting mode, and wherein receiving the user selection of the first set of content items included within the content of the electronic document being displayed in the first portion of the user interface while operating in the selecting mode causes the set of slides to be generated for the selected first set of content items without an additional user interaction with the user interface.

8. The method of claim 1, further comprising:
   receiving a user selection to add the set of slides to an existing slide presentation; and
   responsive to the user selection to add the set of slides to the existing slide presentation, causing the set of slides to be added to the existing slide presentation.

9. The method of claim 1, further comprising:
receiving a user selection to save the set of slides as a new slide presentation; and
responsive to the user selection to save the set of slides as the new slide presentation, causing the set of slides to be saved as the new slide presentation.

10. A method comprising:
providing, to a user device of a user, a user interface including an electronic document having content in a first portion of the user interface, wherein the content comprises at least a first set of content items and a second set of content items;
receiving a request to generate a set of slides based on a user selection of the first set of content items included within the content of the electronic document being displayed in the first portion of the user interface;
determining, based on at least one of a format or a style of one or more content items of the selected first set of content items, a number of slides to be displayed in a second portion of the user interface; and
causing the user interface to be modified to include, in the second portion of the user interface, the set of slides comprising the determined number of slides, wherein a first content item of the selected first set of content items is included in a first slide of the set of slides that is associated with at least one of a first format or a first style of the first content item and a second content item of the selected first set of content items that is included in a second slide of the set of slides that is associated with at least one of a second format or a second style of the second content item, and wherein each of the set of slides are displayed in the second portion of the user interface while the user interface continues to display the electronic document including the selected first set of content items and the second set of content items in the first portion of the user interface.

11. The method of claim 10, further comprising:
receiving, from the user device, an edit to the first slide of the set of slides being displayed in the second portion of the user interface; and
responsive to receiving the edit, causing the user interface to be modified to include, in the second portion of the user interface, the first slide with the edit while continuing to display the electronic document including the selected first set of content items in the first portion of the user interface.

12. The method of claim 10, further comprising:
receiving a second request to enable summarization of content for the first slide of the set of slides;
responsive to the second request, reducing the content in the first slide from a first number of sentences to a second lesser number of sentences; and
causing the user interface to be modified to include the first slide with the reduced content in the second portion of the user interface while continuing to display the electronic document including the selected first set of content items in the first portion of the user interface.

13. The method of claim 10, further comprising:
receiving a second request to add the set of slides to an existing slide presentation; and
responsive to the second request, adding the set of slides to the existing slide presentation in a data store.

14. The method of claim 10, further comprising:
receiving a second request to save the set of slides as a new slide presentation; and
responsive to the second request, saving the set of slides as the new slide presentation in a data store.

15. The method of claim 10, wherein the electronic document is a collaborative text document that is concurrently editable by more than one user.

16. A method comprising:
displaying, in a user interface at a user device, a first electronic document including content, wherein the content comprises one or more content items each associated with at least one of a first format or a first style;
receiving, via the user interface, a user request to view one or more slides from a second electronic document within the user interface;
displaying, via the user interface, the first electronic document and the one or more slides from the second electronic document;
receiving, via the user interface, a user selection of a slide of the one or more slides to insert at a target location of the first electronic document, wherein the selected slide comprises a layout template associated with at least one of a second format or a second style;
identifying a content item included within the content of the first electronic document, wherein the content item is nearest to the target location of the first electronic document and comprises at least one of the first format or the first style that corresponds with at least one of the second format or the second style of the layout template of the selected slide; and
responsive to the user selection of the slide, modifying the user interface to include the selected slide at the target location of the first electronic document, wherein the selected slide includes at least the identified content item.

17. The method of claim 16, further comprising:
receiving an edit to the slide in-line in the first electronic document; and
modifying the user interface to include the slide with the edit in the first electronic document.

18. The method of claim 16, wherein the user selection of the slide comprises dragging the slide being displayed in a first portion of the user interface and dropping the slide at the target location in the first electronic document being displayed in a second portion of the user interface.

19. The method of claim 16, wherein the user selection of the slide comprises selecting the slide from a dropdown menu in the user interface.

20. The method of claim 16, wherein the first electronic document comprises a text document and the second electronic document comprises a slide presentation.

21. A method comprising:
providing, to a user device of a user, a user interface including a first electronic document having content, wherein the content comprises one or more content items each associated with at least one of a first format or a first style;
receiving, at a server, a request to view one or more slides from a second electronic document within the user interface;
displaying, via the user interface, the first electronic document and the one or more slides from the second electronic document;
receiving, at the server, a second request to insert a slide of the one or more slides at a target location of the first electronic document from the user device, wherein the slide comprises a layout template associated with at least one of a second format or a second style;
identifying, by the server, a content item included within the content of the first electronic document, wherein the content item is nearest to the target location of the first electronic document and comprises at least one of the first format or the first style that corresponds with at least one of the second format or the second style of the layout template of the slide;

responsive to the second request, inserting the slide into the first electronic document; and causing the user interface to be modified to include the slide at the target location of the first electronic document, wherein the selected slide includes at least the identified content item.

22. The method of claim 21, wherein the first electronic document comprises a text document and the second electronic document comprises a slide presentation.

23. The method of claim 21, further comprising:

receiving, from the user device, an edit to the slide;

applying the edit to the slide in the first electronic document; and causing the user interface to be modified to include the slide with the edit in the first electronic document.

* * * * *